United States Patent
Kim

(10) Patent No.: US 12,198,038 B2
(45) Date of Patent: Jan. 14, 2025

(54) METHOD FOR ARTIFICIAL NEURAL NETWORK AND NEURAL PROCESSING UNIT

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 152 days.

(21) Appl. No.: 17/560,270

(22) Filed: Dec. 23, 2021

(65) Prior Publication Data
US 2022/0207337 A1    Jun. 30, 2022

(30) Foreign Application Priority Data

Dec. 31, 2020 (KR) .......... 10-2020-0189766
Aug. 6, 2021 (KR) .......... 10-2021-0103968

(51) Int. Cl.
*G06N 3/063* (2023.01)
*G06N 3/045* (2023.01)

(52) U.S. Cl.
CPC ............ *G06N 3/063* (2013.01); *G06N 3/045* (2023.01)

(58) Field of Classification Search
CPC ........ G06N 3/063; G06N 3/045; G06N 3/048; G06N 3/084; G06N 3/061; G06N 5/04;
(Continued)

(56) References Cited

U.S. PATENT DOCUMENTS 7,136,710 B1 * 11/2006 Hoffberg ............ G16H 40/67
700/83
10,699,189 B2   6/2020 Lie et al.
(Continued)

FOREIGN PATENT DOCUMENTS

CN      107454965 A     12/2017
CN      113077042 A      7/2021
(Continued)

OTHER PUBLICATIONS

Posewsky et al., "Efficient Deep Neural Network Acceleration through FPGA-based Batch Processing," in Int'l Conf. on ReConFigurable Computing and FPGAs 1-8 (2016). (Year: 2016).*
(Continued)

*Primary Examiner* — Ryan C Vaughn
(74) *Attorney, Agent, or Firm* — INVENSTONE PATENT, LLC

(57) ABSTRACT

A method performs a plurality of operations on an artificial neural network (ANN). The plurality of operations includes storing in at least one memory a set of weights, at least a portion of a first batch channel of a plurality of batch channels, and at least a portion of a second batch channel of the plurality of batch channels; and calculating the at least a portion of the first batch channel and the at least a portion of the second batch channel by the set of weights. A batch mode, configured to process a plurality of input channels, can determine the operation sequence in which the on-chip memory and/or internal memory stores and computes the parameters of the ANN. Even if the number of input channels increases, processing may be performed with one neural processing unit including a memory configured in consideration of a plurality of input channels.

28 Claims, 17 Drawing Sheets

(58) Field of Classification Search
CPC ...... G06N 3/065; G06F 9/4881; B60W 50/06; B60W 40/02; B60W 40/08; B60W 2050/0022; B60W 2050/065; B60W 2420/403; B60W 2420/408; B60W 2420/54

See application file for complete search history.

(56) References Cited

U.S. PATENT DOCUMENTS

| | | | |
|---|---|---|---|
| 11,451,758 B1* | 9/2022 | Chaurasia | H04N 13/344 |
| 2018/0314941 A1 | 11/2018 | Lie et al. | |
| 2018/0315159 A1 | 11/2018 | Ould-Ahmed-Vall et al. | |
| 2020/0074634 A1* | 3/2020 | Kecskemethy | A61B 5/015 |
| 2020/0364823 A1* | 11/2020 | Ould-Ahmed-Vall | G06N 20/00 |
| 2021/0042620 A1* | 2/2021 | Chen | G06N 3/08 |
| 2021/0342586 A1* | 11/2021 | Fleisig | G06V 10/457 |
| 2021/0347328 A1* | 11/2021 | Bhattacharya | G05B 13/027 |
| 2022/0092382 A1* | 3/2022 | Moshovos | G06N 3/045 |

FOREIGN PATENT DOCUMENTS

| | | |
|---|---|---|
| KR | 10-2019-0129240 A | 11/2019 |
| KR | 10-2021-0014056 A | 2/2021 |
| WO | 2019-216513 A1 | 11/2019 |

OTHER PUBLICATIONS

Chen et al., "Condensation-Net: Memory-Efficient Network Architecture with Cross-Channel Pooling Layers and Virtual Feature Maps," in Proc. IEEE/CVF Conf. Computer Vision and Pattern Recognition Workshops (2019). (Year: 2019).*

A Korean Office Action issued on Mar. 28, 2023 in connection with Korean Patent Application No. 10-2021-0103968 (English translation attached).

Chinese Office Action dated Nov. 23, 2024 issued on Application No. 202111624452.3.

* cited by examiner

FIG. 10

METHOD FOR ARTIFICIAL NEURAL NETWORK AND NEURAL PROCESSING UNIT

CROSS-REFERENCE TO RELATED APPLICATIONS

This application claims the priority of Korean Patent Application No. 10-2020-0189766 filed on Dec. 31, 2020 and No. 10-2021-0103968 filed on Aug. 6, 2021, in the Korean Intellectual Property Office, the disclosure of which is incorporated herein by reference.

BACKGROUND OF THE DISCLOSURE

Technical Field

The present disclosure relates to a method for an artificial neural network and to a neural processing unit.

Background Art

Humans are equipped with intelligence that can perform recognition, classification, inference, prediction, and control/decision making. Artificial intelligence (AI) refers to artificially mimicking human intelligence.

The human brain is made up of numerous nerve cells called neurons, and each neuron is connected to hundreds to thousands of other neurons through connections called synapses. In order to imitate human intelligence, the modeling of the operating principle of biological neurons and the connection relationship between neurons is called an artificial neural network (ANN) model. That is, an artificial neural network is a system that connects nodes that mimic neurons in a layer structure.

These artificial neural network models are divided into "single-layer neural network" and "multi-layer neural network" according to the number of layers.

A general multi-layer neural network consists of an input layer, a hidden layer, and an output layer, wherein (1) the input layer is a layer that receives external data, and the number of neurons in the input layer is the same as the number of input variables, (2) the hidden layer is located between the input layer and the output layer, receives a signal from the input layer, extracts characteristics, and transmits it to the output layer, and (3) the output layer receives a signal from the hidden layer and outputs it to the outside. The input signal between neurons is multiplied by each connection strength with a value between zero and one and then summed. If this sum is greater than the neuron threshold, the neuron is activated and implemented as an output value through the activation function.

Meanwhile, in order to implement higher artificial intelligence, an increase in the number of hidden layers of an artificial neural network is called a deep neural network (DNN).

There are several types of DNNs, but convolutional neural networks (CNNs) are known to be easy to extract features from input data and identify patterns of features.

A convolutional neural network (CNN) is a neural network that functions similar to image processing in the visual cortex of the human brain. Convolutional neural networks are known to be suitable for image processing.

Referring to FIG. 4, the convolutional neural network is configured in a form in which convolutional channels and pooling channels are alternatively repeated. In a convolutional neural network, most of the computation time is occupied by the operation of convolution. A convolutional neural network recognizes objects by extracting image features of each channel by a matrix-type kernel, and providing homeostasis such as movement or distortion by pooling. For each channel, a feature map is obtained by convolution of the input data and the kernel, and an activation function such as Rectified Linear Unit (ReLU) is applied to generate an activation map of the corresponding channel. Pooling may then be applied. The neural network that actually classifies the pattern is located at the end of the feature extraction neural network, and is called a fully connected layer. In the computational processing of convolutional neural networks, most computations are performed through convolution or matrix multiplication. At this time, the necessary kernels are read from memory quite frequently. A significant portion of the operation of the convolutional neural network takes time to read the kernels corresponding to each channel from the memory.

The memory may be divided into main memory, internal memory, and on-chip memory. Each memory consists of a plurality of memory cells, and each memory cell of the memory has a unique memory address. In particular, when the neural processing unit reads a weight stored in the main memory, a latency of several clock cycles may occur until the memory cell corresponding to the address of the memory is accessed.

Therefore, there is a problem in that the time and power consumed to read the necessary parameters from the main memory and perform the convolution are significant.

SUMMARY OF THE DISCLOSURE

The inventor of the present disclosure has recognized the following matters.

First, in the inference operation of the artificial neural network model, the neural processing unit (NPU) frequently reads the node (i.e., features) and/or weight value (i.e., kernels) of each layer of the artificial neural network model from the main memory.

The NPU suffers due to a slow processing speed and a large energy consumption when reading the node and/or kernel weight values of the artificial neural network model from the main memory.

As access to on-chip memory or NPU internal memory increases rather than access to main memory, the processing speed of the NPU increases and energy consumption decreases.

When multiple channels are processed with one NPU and one artificial neural network model, it is inefficient to repeatedly read the same weight from the main memory whenever each channel is individually processed.

In particular, when processing batch channels in which data is arranged and processed in a queue, the utilization of the on-chip memory or the NPU internal memory can be maximized according to the characteristics of the processing method and order.

Finally, it is possible to maximize processing speed and reduce energy consumption by maximally maintaining parameters that are repeatedly used or reused in the convolution processing of batch channels in on-chip memory or NPU internal memory. That is, it is possible to reuse at least one kernel or at least one weight value corresponding to a plurality of feature maps of a plurality of batch channels, respectively, by maintaining said at least one kernel or said at least one weight value until completing calculation of the corresponding feature maps of a plurality of batch channels.

Accordingly, a problem to be solved by the present disclosure is to provide a neural processing unit capable of reducing the number of read operations of main memory and reducing power consumption by determining storing order of on-chip memory or NPU internal memory and calculating order of parameters of an artificial neural network, and an operation method thereof.

Another problem to be solved by the present disclosure is to provide a neural processing unit having high performance with low power consumption in an autonomous vehicle, a drone, or an electronic device having a plurality of sensors, in which batch channels are frequently processed, and an operation method thereof.

In order to solve the problems as described above, a method for an artificial neural network according to an example of the present disclosure is provided.

According to an aspect of the present disclosure, there is provided a method of performing a plurality of operations on an artificial neural network (ANN). The plurality of operations may include storing in at least one memory a set of weights, at least a portion of a first batch channel of a plurality of batch channels, and at least a portion of a second batch channel of the plurality of batch channels; and calculating the at least a portion of the first batch channel and the at least a portion of the second batch channel by the set of weights.

The at least a portion of the first batch channel and the at least a portion of the second batch channel may be substantially equal in size.

The set of weights may correspond to each of the at least a portion of the first batch channel and the at least a portion of the second batch channel.

The plurality of operations may further include storing in the at least one memory at least another portion of the first batch channel to be computed subsequently in at least a portion of the at least one memory while calculating the at least a portion of the second batch channel by the set of weights, and the at least one memory may include at least one of an on-chip memory and an internal memory.

The plurality of operations may further include storing in the at least one memory at least a portion of a third batch channel of the plurality of batch channels and at least a portion of a fourth batch channel of the plurality of batch channels in the at least one memory while maintaining the set of weights; and calculating the at least a portion of the third batch channel and the at least a portion of the fourth batch channel by the set of weights. The at least one memory may include at least one of an on-chip memory and an internal memory in which the set of weights is maintained until at least a portion of each of the plurality of batch channels is calculated.

The plurality of operations may further include storing in the at least one memory a subsequent set of weights, a subsequent portion of the first batch channel, and a subsequent portion of the second batch channel; and calculating the subsequent portion of the first batch channel and the subsequent portion of the second batch channel by the subsequent set of weights, and the at least one memory may include at least one of an on-chip memory and an internal memory.

The plurality of operations may further include storing in the at least one memory the set of weights and a set of first values calculated from the at least a portion of the first batch channel and the at least a portion of the second batch channel; storing in the at least one memory a subsequent set of weights for a subsequent processing step; and calculating the set of first values and the subsequent set of weights. The at least one memory may include an internal memory in which are stored the set of first values and a set of second values obtained by calculating the subsequent set of weights.

The at least a portion of the first batch channel and the at least a portion of the second batch channel may include a complete data set.

The plurality of operations may further include tiling a size of the set of weights, a size of the at least a portion of the first batch channel, and a size of the at least a portion of the second batch channel to be fit into the at least one memory, and the at least one memory may include an internal memory.

The ANN may be configured to perform at least one operation of the plurality of operations, the at least one operation including detection, classification, or segmentation of an object from the plurality of batch channels. The object may include at least one of a vehicle, a traffic-light, an obstacle, a pedestrian, a person, an animal, a road, a traffic-sign, and a lane.

The plurality of operations may further include preprocessing the plurality of batch channels before the at least a portion of the first batch channel and the at least a portion of the second batch channel are stored in the at least one memory. The ANN may be configured to simultaneously detect the object from the plurality of batch channels, while pre-processing the plurality of batch channels for improved object detection rate.

Each of the plurality of batch channels may correspond to a plurality of images, respectively. The plurality of batch channels includes at least one batch channel having one of an IR, RGB, YCBCR, HSV, and HIS format. The plurality of batch channels may include at least one batch channel for capturing an image of an interior of a vehicle, and the ANN may be configured to detect at least one of an object, a function, a driver state, and a passenger state related to vehicle-safety. The plurality of images may include at least one of an RGB image, an IR image, a radar image, an ultrasound image, a lidar image, a thermal image, a NIR image, and a fusion image. The plurality of images may be captured in substantially the same time period.

Each of the plurality of batch channels corresponds to a plurality of sensor data, respectively, and the plurality of sensor data includes data from at least one of a pressure sensor, a piezo sensor, a humidity sensor, a dust sensor, a smog sensor, a sonar sensor, a vibration sensor, an acceleration sensor, and a motion sensor.

According to another aspect of the present disclosure, there is provided a neural processing unit for an artificial neural network for processing a plurality of batch channels including a first batch channel and a second batch channel. The neural processing unit may include at least one internal memory configured to store at least a portion of the first batch channel, at least a portion of the second batch channel, and a set of weights; and at least one processing element (PE) configured to apply the stored set of weights to the at least a portion of the first batch channel and the at least a portion of the second batch channel.

The at least a portion of the first batch channel allocated to the at least one internal memory and the at least the second batch channel allocated to the at least one internal memory may be substantially equal in size.

The set of weights may correspond to each of the at least a portion of the first batch channel and the at least a portion of the second batch channel.

The plurality of batch channels may include a third batch channel and a fourth batch channel. The at least one internal memory may be further configured to store at least a portion of the third batch channel and at least a portion of the fourth batch channel while maintaining the set of weights, and the at least one PE may be further configured to calculate the at least a portion of a third batch channel, the at least a portion of a fourth batch channel, and the set of weights. The at least one internal memory may be further configured to maintain the set of weights until the plurality of batch channels are calculated.

The at least one PE may be further configured to calculate a subsequent portion of the first batch channel, a subsequent portion of the second batch channel, and another set of weights, and the at least one internal memory may be further configured to store the subsequent portion of the first batch channel, the subsequent portion of the second batch channel, and the other set of weights.

The at least one PE may be further configured to calculate another set of weights for a subsequent stage and values from the at least a portion of the first batch channel and the at least a portion of the second batch channel. The at least one internal memory may be further configured to store the calculated values and the other set of weights, and the other set of weights may be maintained in the internal memory until the plurality of batch channels are calculated.

The at least one PE may be further configured to calculate first values from the at least a portion of the first batch channel and the at least a portion of the second batch channel and to calculate a subsequent set of weights for a subsequent processing stage, and the at least one internal memory may be further configured to correspond in size to the at least a portion of the first batch channel and the at least a portion of the second batch channel, and store the first values, the set of weights, and the subsequent set of weights.

The neural processing unit may further include a scheduler configured to adjust a size of the set of weights, a size of the at least a portion of the first batch channel, and a size of the at least a portion of the second batch channel to the internal memory.

According to another aspect of the present disclosure, there is provided a neural processing unit for an artificial neural network (ANN) for processing a plurality of batch channels including a first batch channel and a second batch channel. The neural processing unit may include at least one internal memory configured to store at least a portion of the first batch channel, at least a portion of the second batch channel, and a set of weights; and at least one processing element (PE) configured to apply the stored set of weights to the at least a portion of the first batch channel and the at least a portion of the second batch channel, and the at least a portion of the first batch channel may have a size less than or equal to a size of the at least one internal memory divided by a number of the plurality of batch channels.

The size of the at least one internal memory may correspond to a size of a largest feature map of the ANN and the number of the plurality of batch channels.

The at least one internal memory may be further configured to store compressed parameters of the ANN.

The neural processing unit may further includer a scheduler operatively coupled to the at least one PE and the at least one internal memory and configured to adjust a size of the at least a portion of the first batch channel or a size of the at least a portion of the second batch channel.

The neural processing unit may further include an activation function processing unit located between the at least one PE and the at least one internal memory and configured to sequentially process feature maps corresponding to the first and second batch channels to sequentially output activation maps corresponding to the first and second batch channels.

According to the present disclosure, a batch mode, configured to process a plurality of input channels, can determine the operation sequence in which the on-chip memory and/or internal memory stores and computes the parameters of the artificial neural network. Accordingly, the number of main memory read operations can be reduced and power consumption can be reduced.

According to the present disclosure, even if the number of input channels increases, processing may be performed with one neural processing unit including an on-chip memory and/or an internal memory configured in consideration of a plurality of input channels.

In addition, according to the present disclosure, it is possible to provide a neural processing unit having high performance with low power consumption in an autonomous vehicle, a drone, or an electronic device having a plurality of sensors, which frequently processes batch channels.

In addition, according to the present disclosure, it is possible to provide a neural processing unit dedicated to a batch mode in which the size of an on-chip memory or an internal memory is determined in consideration of the number of batch channels and computational performance.

The effects according to the present disclosure are not limited to the contents exemplified above, and more various effects are included in the present specification.

BRIEF DESCRIPTION OF THE DRAWINGS

FIG. 10 is an exemplary schematic diagram illustrating allocation of artificial neural network parameters in a memory space in an NPU according to the example of FIG. 9.

DETAILED DESCRIPTION OF THE EMBODIMENT

Figure 1:
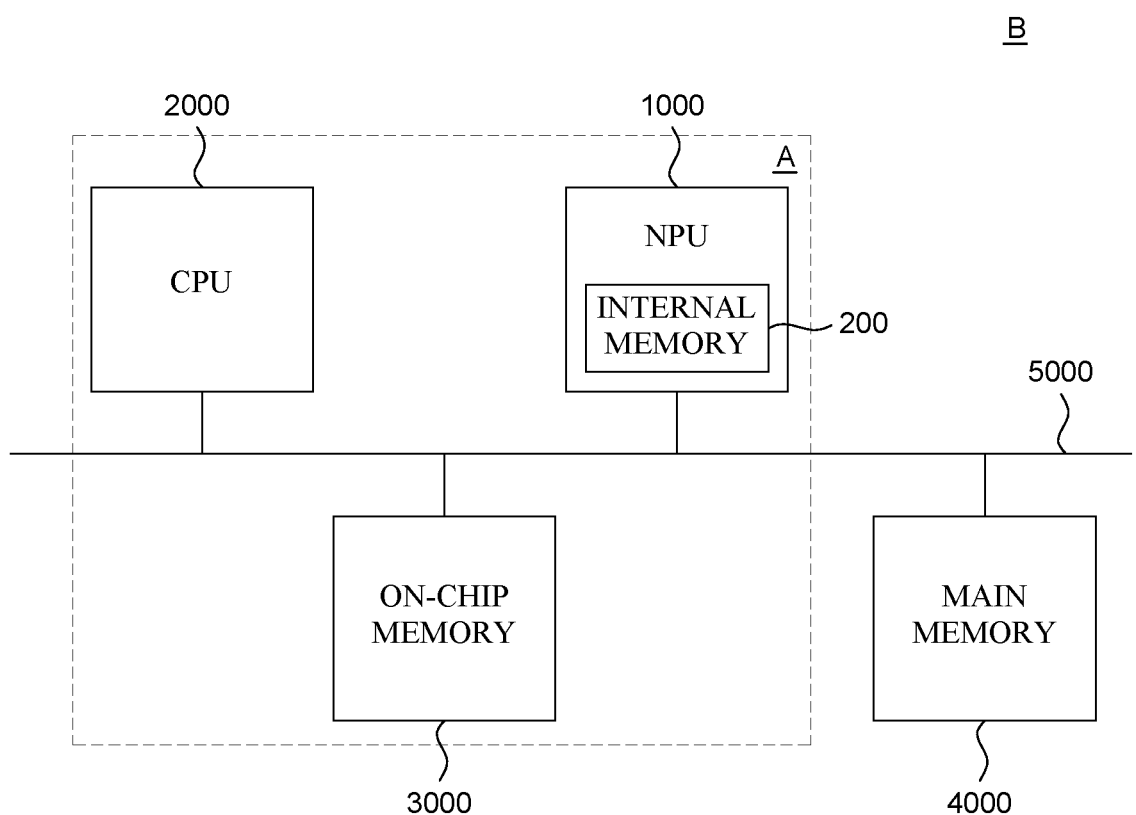
FIG. 1 is a schematic conceptual diagram illustrating an apparatus including a neural processing unit according to an example of the present disclosure.

Particular structural or step-by-step descriptions for examples according to the concept of the present disclosure disclosed in the present specification or application are merely exemplified for the purpose of explaining the examples according to the concept of the present disclosure.

Examples according to the concept of the present disclosure may be embodied in various forms, and examples according to the concept of the present disclosure may be embodied in various forms, and should not be construed as being limited to the examples described in the present specification or application.

Since the examples according to the concept of the present disclosure may have various modifications and may have various forms, specific examples will be illustrated in the drawings and described in detail in the present specification or application. However, this is not intended to limit the examples according to the concept of the present disclosure with respect to the specific disclosure form, and should be understood to include all modifications, equivalents, and substitutes included in the spirit and scope of the present disclosure.

Terms such as first and/or second may be used to describe various elements, but the elements should not be limited by the terms.

The above terms are only for the purpose of distinguishing one element from another element, for example, without departing from the scope according to the concept of the present disclosure, and a first element may be termed a second element, and similarly, a second element may also be termed a first element.

When an element is referred to as being "connected to" or "in contact with" another element, it is understood that the other element may be connected to or in contact with the other element, but other elements may be disposed therebetween. On the other hand, when it is mentioned that a certain element is "directly connected to" or "in direct contact with" another element, it should be understood that no other element is present therebetween.

Other expressions describing the relationship between elements, such as "between" or "adjacent to" and "directly adjacent to," etc., should be interpreted similarly.

As used herein, expressions such as "first," "second," and "first or second" may modify various elements, regardless of order and/or importance. In addition, it is used only to distinguish one element from other elements, and does not limit the elements. For example, the first user apparatus and the second user apparatus may represent different user apparatus regardless of order or importance. For example, without departing from the scope of rights described in this disclosure, the first element may be named as the second element, and similarly, the second element may also be renamed as the first element.

Terms used in present disclosure are only used to describe specific examples, and may not be intended to limit the scope of other examples.

The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of a related art. Also, unless explicitly defined in this document, it should not be construed in an ideal or overly formal sense. In some cases, even terms defined in the present disclosure cannot be construed to exclude examples of the present disclosure.

The terms used herein are used only to describe specific examples, and are not intended to limit the present disclosure.

The singular expression may include the plural expression unless the context clearly dictates otherwise. Terms used herein, including technical or scientific terms, may have the same meanings as commonly understood by one of ordinary skill in the art described in this document. The term "data" is intended to cover both singular and plural forms.

Unless defined otherwise, all terms used herein, including technical or scientific terms, have the same meaning as commonly understood by one of ordinary skill in the art to which this disclosure pertains. Terms such as those defined in a commonly used dictionary should be interpreted as having a meaning consistent with the meaning in the context of a related art, and should not be interpreted in an ideal or excessively formal meaning unless explicitly defined in the present specification.

Each of the features of the various examples of the present disclosure may be partially or wholly combined or combined with each other. In addition, as those skilled in the art can fully understand, technically various types of interlocking and driving are possible, and each example may be implemented independently of each other or may be implemented together in a related relationship.

In describing the embodiments, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Hereinafter, in order to facilitate understanding of the disclosures presented in the present specification, terms used in the present specification will be briefly summarized.

NPU: an abbreviation of neural processing unit, which may refer to a processor specialized for computation of an artificial neural network model separately from a central processing unit (CPU).

NPU scheduler (or scheduler): The NPU scheduler may mean a unit for controlling the overall task (task) of the NPU. For the NPU scheduler to run in the NPU, the compiler analyzes the data locality of the ANN model and receives the operation sequence information of the compiled ANN model to determine the NPU's work processing order. The NPU scheduler may control the NPU in a static task sequence determined based on the data locality of the static ANN model. The NPU scheduler can dynamically analyze the data locality of the ANN model to control the NPU in a dynamic task sequence. Tiling information for each layer of the ANN model may be stored in the NPU scheduler based on the memory size of the NPU and the performance of the processing element array. The NPU scheduler can control the overall tasks of the NPU by using the register map. The NPU scheduler may be included in the NPU or may be disposed outside the NPU.

ANN: an abbreviation of artificial neural network. It may refer to a network in which nodes are connected in a layer structure to imitate human intelligence by mimicking those neurons in the human brain which are connected through synapses.

Information on the structure of the artificial neural network: Information including information on the number of layers, the number of nodes in a layer, the value of each node, information on an operation processing method, information on a weight matrix applied to each node, and the like.

Information on data locality of artificial neural network: information that allows the neural processing unit to predict the operation sequence of the artificial neural network model processed by the neural processing unit based on the data access request sequence requested to a separate memory.

DNN: an abbreviation of Deep Neural Network, which may mean that the number of hidden layers of the artificial neural network is increased in order to implement higher artificial intelligence.

CNN: an abbreviation for Convolutional Neural Network, a neural network that functions similar to image processing in the visual cortex of the human brain. Convolutional neural networks are known to be suitable for image processing, and are known to be superior to extract features from input data and identify patterns of features.

Fused-ANN: an abbreviation of Fused Artificial Neural Network, which may refer to an artificial neural network designed to process sensor-fused data. Sensor fusion is mainly used in the field of autonomous driving technology. Sensor fusion may be a technology in which a different type of sensor compensates when the sensing performance of one sensor is poor under a specific condition. The number of sensor fusions may vary, such as camera and thermal imaging camera fusion, camera and radar fusion, camera and lidar fusion, camera and radar and lidar fusion, etc. The convergence neural network may be an artificial neural network model in which multiple sensor data is fused by adding additional operators such as skip-connection, squeeze-and-excitation, and concatenation.

Hereinafter, the present disclosure will be described in detail by describing examples of the present disclosure with reference to the accompanying drawings.

FIG. 1 illustrates an apparatus including a neural processing unit according to an example of the present disclosure.

Referring to FIG. 1, a device B including an NPU 1000 includes an on-chip region A. The main memory 4000 may be included in the device B and disposed outside the on-chip area. The main memory 4000 may be, for example, a system memory such as DRAM. A storage unit including a ROM may be included outside the on-chip area A.

In the on-chip area A, a general-purpose processing unit such as a central processing unit (CPU) 2000, an on-chip memory 3000, and an NPU 1000 are disposed. The CPU 2000 is operatively connected to the NPU 1000, the on-chip memory 3000, and the main memory 4000.

However, the present disclosure is not limited to the above configuration thereto. For example, the NPU 1000 may be included in the CPU 2000.

The on-chip memory 3000 is a memory mounted on a semiconductor die. The on-chip memory 3000 may be a memory for caching separately from accessing the main memory 4000. The on-chip memory 3000 may be a memory configured to be accessed by other on-chip semiconductors. The on-chip memory 3000 may be a cache memory or a buffer memory.

The NPU 1000 may include an internal memory 200, and the internal memory 200 may include, for example, SRAM. The internal memory 200 may be a memory used only for operations in the NPU 1000. The internal memory 200 may be referred to as NPU internal memory. Here, the term "substantial" may mean that the internal memory 200 is configured to store data related to the artificial neural network processed by the NPU 1000.

For example, the internal memory 200 may be a buffer memory and/or cache memory configured to store a weight, a kernel (i.e., a weight), and/or a feature map required for the NPU 1000 operation. However, the present disclosure is not limited thereto.

For example, the internal memory 200 may be configured as a memory device that reads and writes SRAM, MRAM, register files, etc. faster than the main memory 4000. However, the present disclosure is not limited thereto.

The device B including the NPU 1000 may include at least one of an internal memory 200, an on-chip memory 3000, and a main memory 4000.

The term "at least one memory" described below is intended to include at least one of the internal memory 200 and the on-chip memory 3000.

Further, the description of the on-chip memory 3000 may be intended to include the internal memory 200 of the NPU 1000 or a memory external to the NPU 1000 but in the on-chip region A.

However, the internal memory 200 and/or the on-chip memory 3000 indicating at least one memory may be distinguished from the main memory 4000 based on the bandwidth of the memory rather than the locational characteristic.

In general, the main memory 4000 refers to a memory that is superior to store a large amount of data, has a relatively low memory bandwidth, and consumes a relatively large amount of power.

In general, the internal memory 200 and the on-chip memory 3000 refer to memories having a relatively high memory bandwidth and relatively low power consumption, but inefficient for storing large amounts of data.

Each element of the device B including the NPU 1000 may communicate via the bus 5000. There may be at least one bus 5000 of device B. The bus 5000 may be referred to as a communication bus, and/or a system bus, or the like.

The internal memory 200 and the on-chip memory 3000 of the NPU 1000 may further include a separate dedicated bus in order to guarantee more than a specific bandwidth for processing the weight and feature map of the artificial neural network model.

It is also possible to further include a separate dedicated bus between the on-chip memory 3000 and the main memory 4000 in order to guarantee more than a specific bandwidth. The specific bandwidth may be determined based on the processing performance of the processing element array of the NPU 1000.

Between the internal memory 200 and the main memory 4000 of the NPU 1000, it is also possible to further include a separate dedicated bus to ensure more than a specific bandwidth. The specific bandwidth may be determined based on the processing performance of the processing element array of the NPU 1000.

The device B with NPU 1000 may also further include a direct memory access (DMA) module and may be configured to directly control the internal memory 200, the on-chip memory 3000, and/or the main memory 4000. The DMA module may be configured to directly control the data transfer of the NPU 1000 and the on-chip memory 3000 by directly controlling the bus 5000. The DMA module may be configured to directly control data transfer between the on-chip memory 3000 and the main memory 4000 by directly controlling the bus 5000. The DMA module may be configured to directly control data transfer between the internal memory 200 and the main memory 4000 by directly controlling the bus 5000.

The neural processing unit (NPU) 1000 is a processor specialized to perform an operation for an artificial neural network. The NPU 1000 may be referred to as an AI accelerator.

An artificial neural network (ANN) refers to a network of artificial neurons that multiplies and adds weights when multiple inputs or stimuli are received, and transforms and transmits the value obtained by adding an additional deviation through an activation function. An artificial neural network trained in this way can be used to output inference results from input data.

The NPU 1000 may be a semiconductor implemented as an electric/electronic circuit. The electric/electronic circuit may include a number of electronic devices, e.g., a transistor or a capacitor. The NPU 1000 may include a processing element (PE) array (i.e., a plurality of processing elements), an NPU internal memory 200, an NPU scheduler, and an NPU interface. Each of the processing element array, the NPU internal memory 200, the NPU scheduler, and the NPU interface may be a semiconductor circuit to which numerous transistors are connected.

Accordingly, some of the transistors may be difficult or impossible to identify and distinguish with the human eye, and may be identified only by operation. For example, any circuit may operate as an array of processing elements, or may operate as an NPU scheduler.

The NPU 1000 may include a processing element array, an NPU internal memory 200 configured to store at least a portion of an artificial neural network model that can be inferred from the processing element array, and an NPU scheduler configured to control the processing element array and the NPU internal memory 200 based on data locality information of the artificial neural network model or information about the structure of the artificial neural network model.

The artificial neural network model may include information on data locality information or structure of the artificial neural network model. The artificial neural network model may refer to an AI recognition model trained to perform a specific inference function.

The processing element array may perform operations for the artificial neural network. For example, when input data is input, the array of processing elements may cause the artificial neural network to perform training. After training is completed, when input data is input, the processing element array may perform an operation of deriving an inference result through the trained artificial neural network.

For example, the NPU 1000 may load the data of the artificial neural network model stored in the main memory 4000 through the NPU interface to the NPU internal memory 200. The NPU interface may communicate with the main memory 4000 through the bus 5000.

The NPU scheduler is configured to control the operation of the processing element array for the inference operation of the NPU 1000 and the read and write order of the NPU internal memory 200. The NPU scheduler is also configured to adjust the size of at least a portion of the batch channel.

The NPU scheduler analyzes the structure of the artificial neural network model or is provided with the structure of the artificial neural network model. Next, the NPU scheduler sequentially determines the operation order for each layer. That is, when the structure of the artificial neural network model is determined, the operation sequence for each layer may be determined. The sequence of operations or data flow according to the structure of the artificial neural network model can be defined as the data locality of the artificial neural network model at the algorithm level.

The NPU scheduler sequentially determines the operation order for each layer by reflecting the structure of the artificial neural network model and the number of deployment channels. That is, when the structure of the artificial neural network model and the number of channels are determined, the operation sequence for each layer may be determined. The order of operation or data flow according to the number of batch channels and the structure of the artificial neural network model can be defined as the data locality of the artificial neural network model at the algorithm level or the data locality of the artificial neural network model of the batch mode. Hereinafter, the data locality of the artificial neural network model of the batch mode may be referred to as data locality of the artificial neural network model.

The data locality of the artificial neural network model may be determined in consideration of the structure of the artificial neural network model, the number of batch channels, and the NPU structure.

When the compiler compiles the artificial neural network model so that the artificial neural network model is executed in the NPU 1000, the neural network data locality of the neural network model at the neural processing unit-memory level may be reconstructed. For example, the compiler may be executed by the CPU 2000.

That is, weight values loaded into the internal memory and the size of the batch channel may be determined according to the compiler, the algorithms applied to the artificial neural network model, the operating characteristics of the NPU 1000, the size of the weight values, and the size of the feature map or the batch channels.

For example, even in case of the same artificial neural network model, the calculation method of the artificial neural network model to be processed may be configured according to the method and the characteristics in which the NPU 1000 calculates the corresponding artificial neural network model, for example, a feature map tiling method, a stationary method of processing elements and the like, the number of processing elements of the NPU 1000, the size of the feature map and the size of the weight in the NPU 1000, the internal memory capacity, the memory hierarchy of the NPU 1000, and an algorithmic characteristic of the compiler that determines the sequence of operations of the NPU 1000 for processing the artificial neural network model. This is because even if the same artificial neural network model is processed by the above-mentioned factors, the NPU 1000 may differently determine the sequence of data required at each moment in clock units.

Figure 2A:
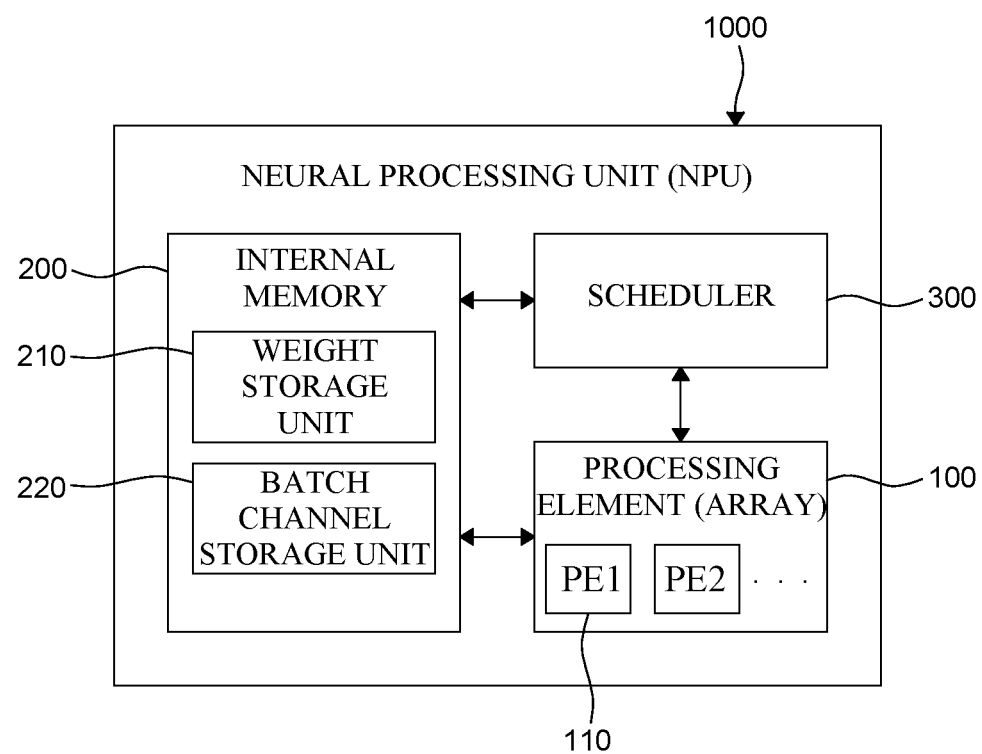
FIG. 2A is a schematic conceptual diagram illustrating a neural processing unit (NPU) according to an example of the present disclosure.

FIG. 2A illustrates a neural processing unit according to an example of the present disclosure.

Referring to FIG. 2A, a neural processing unit (NPU) 1000 may include a scheduler 300, an array of processing elements 100, and an internal memory 200.

The NPU scheduler 300 may be configured to control the processing element array 100 and the NPU internal memory 200 in consideration of the size of the weight values of the artificial neural network model, the size of the feature map, and the calculation sequence of the weight values and the feature map.

The NPU scheduler 300 may receive the size of the weight values to be calculated in the processing element array 100, the size of the feature map, and the calculation sequence of the weight values and the feature map. The artificial neural network data of the artificial neural network model may include node data or feature maps of each layer, and weight data of each connection network connecting nodes of each layer. At least some of the data or parameters of the artificial neural network may be stored in a memory provided inside the NPU scheduler 300 or the NPU internal memory 200.

Among the parameters of the artificial neural network, the feature map may be composed of a batch channel. Here, the plurality of batch channels may be, for example, images captured by a plurality of image sensors during substantially the same period (e.g., between 10 ms and 100 ms).

The NPU scheduler 300 may control the processing element array 100 and the internal memory 200 by performing, for example, a convolution operation of an artificial neural network. First, the NPU scheduler 300 may load a set of weight values into the weight storage unit 210 of the internal memory 200 and may load a portion of a plurality of batch channels corresponding to the set of weight values into the batch channel storage unit 220 of the internal memory 200. The NPU scheduler 300 may load a plurality of batch channels to be calculated next while maintaining a set of weight values in the internal memory 200 after a set of weight values and some of the plurality of batch channels are calculated. Although the internal memory 200 is illustrated as including the weight storage unit 210 and the batch channel storage unit 220 separately, it is merely an example. In another example, the internal memory 200 may be logically divided or variably allocated through a memory address or the like, or the internal memory 200 may not be divided.

In various examples, a set of weight values may be a fraction of the total weight values. In this case, a portion of the plurality of batch channels, for example, a portion of the first batch channel and a portion of the second batch channel may be calculated first, and a next portion of the first batch channel and a next portion of the second batch channel may be calculated next. Alternatively, a portion of the plurality of batch channels, for example, a portion of the first batch channel and a portion of the second batch channel, may be calculated first, and then a portion of the third batch channel and a portion of the fourth batch channel may be calculated next.

In various examples, while a set of weight values are calculated with a portion of the second batch channel, a portion of the third batch channel to be calculated next may be loaded into the portion of the already calculated first batch channel. When the next calculated parameter is loaded into the internal memory at the same time as the calculation, the processing speed may become faster.

In the example described above, the parameters of the artificial neural network have been described as being stored in the internal memory 200 of the NPU, but the present disclosure is not limited thereto. For example, the parameters may be stored in the on-chip memory or the main memory.

The configuration for improving the processing speed in the NPU 1000 of the present disclosure is to minimize a frequency of reading of the DRAM memory or the main memory, which will be described with reference to FIG. 2B, by storing the weight values in the memory (i.e., any kind of memory) and then maintaining the weight values as much as possible without additional memory access. Since the number of main memory read operations for weight values or feature maps is proportional to energy consumption and inversely proportional to processing speed, reducing the number of main memory read operations for these values can increase processing speed while reducing energy consumption.

Scheduling of a general CPU operates to achieve the best efficiency by considering fairness, efficiency, stability, and response time. That is, it is scheduled to perform the most processing jobs within the same time in consideration of priority and operation time.

Conventional CPUs use an algorithm for scheduling tasks in consideration of data such as priority order of each processing and operation processing time.

Alternatively, the NPU scheduler 300 may determine the processing order based on the calculation method of the parameters of the artificial neural network model, and particularly based on characteristics of the calculation between the batch channels and the weights.

Further, the NPU scheduler 300 may determine the processing order so as not to access the weight set from the main memory again on the basis that one weight set must be applied for all batch channels until one convolution operation is finished. In other words, one convolution operation in the batch mode may mean convolution of a plurality of sequential batch channels with a set of weights, respectively.

However, the present disclosure is not limited to the above-described factors of the NPU 1000, and may be further based on data locality information or information about the structure. For example, information on the data locality information or structure of the NPU 1000 may include data of at least one of the memory size of the NPU internal memory 200, the hierarchy structure of the NPU internal memory 200, data indicating the number of processing elements PE1 to PE12, and the operator architecture of the processing elements PE1 to PE12. The memory size of the NPU internal memory 200 may include information about the memory capacity. The hierarchical structure of the NPU internal memory 200 may include information on a connection relationship between specific hierarchies for each hierarchical structure. The operator structure of the processing elements PE1 to PE12 may include information with respect to the elements inside the processing element.

That is, the NPU scheduler 300 may determine the processing sequence by utilizing data of at least one of the memory size of the NPU internal memory 200, the hierarchy structure of the NPU internal memory 200, the number data of the processing elements PE1 to PE12, and the operator structure of the processing elements PE1 to PE12.

However, the present disclosure is not limited to information on data locality information or structure provided to the NPU 1000.

According to an example of the present disclosure, the NPU scheduler 300 may control at least one processing element and the NPU internal memory 200 based on the calculation method of parameters of the artificial neural network model, and particularly based on characteristics of the calculation between batch channels and weights.

On the other hand, the processing element array 100 may be configured to include a plurality of processing elements 110 (i.e., PE1, PE2, . . . ) configured to calculate node data of an artificial neural network and weight data of a connection network. Each processing element may be configured to include a multiply and accumulate (MAC) operator and/or an arithmetic logic unit (ALU) operator. However, examples according to the present disclosure are not limited thereto.

In FIG. 2A, a plurality of processing elements 110 is illustrated by way of example. However, by modifying the MAC in one processing element, it is also possible to configure operators implemented as a plurality of multipliers and adder trees in parallel. In this case, the processing element array 100 may be referred to as at least one processing element including a plurality of operators.

In addition, the plurality of processing elements 110 illustrated in FIG. 2A is merely an example for convenience of description, and the number of the plurality of processing elements is not limited. The size or number of the processing element array may be determined by the number of the plurality of processing elements 110. The size of the processing element array may be implemented in the form of an N×M matrix, where N and M are integers greater than zero. Accordingly, the processing element array 100 may include N×M processing elements. That is, there may be more than one processing element.

In addition, the processing element array 100 may be made of a plurality of sub-modules. Accordingly, the processing element array 100 may include processing elements composed of N×M×L sub-modules. In more detail, L is the number of sub-modules of the processing element array, and may be referred to as a core, an engine, or a thread.

The size of the processing element array 100 may be designed in consideration of the characteristics of the artificial neural network model in which the NPU 1000 operates. In other words, the number of processing elements may be determined in consideration of the data size of the artificial neural network model to be operated, the required operating speed, the required power consumption, and the like. The size of the data of the artificial neural network model may be determined in correspondence with the number of layers of the artificial neural network model and the weight data size of each layer.

Accordingly, the size of the processing element array 100 according to an example of the present disclosure is not limited thereto. As the number of processing elements 110 of the processing element array 100 increases, the parallel computing power of the operating artificial neural network model increases, but the manufacturing cost and physical size of the NPU 1000 may increase.

For example, the artificial neural network model operated in the NPU 1000 may be an artificial neural network trained to detect thirty specific keywords, that is, an AI keyword recognition model. In this case, the size of the processing element array 100 be designed to be N×M in consideration of the computational amount characteristic. In other words, the NPU 1000 may be configured to include twelve processing elements. However, it is not limited thereto, and the number of the plurality of processing elements 110 may be selected within a range of, for example, 8 to 16,384. That is, examples of the present disclosure are not limited in the number of processing elements.

The processing element array 100 may be configured to perform functions such as addition, multiplication, and accumulation required for artificial neural network operation. In other words, the processing element array 100 may be configured to perform a multiplication and accumulation (MAC) operation.

The internal memory 200 may be a volatile memory. The volatile memory may be a memory in which data is stored only while power is supplied, and stored data is deleted (dumped) when power is cut off. The volatile memory may include a static random-access memory (SRAM), a dynamic random-access memory (DRAM), and the like. The internal memory 200 may preferably be an SRAM, but is not limited thereto.

Hereinafter, a convolutional neural network (CNN), which is a type of a deep neural network (DNN) among artificial neural networks, will be mainly described.

The convolutional neural network may be a combination of one or several convolutional layers, a pooling layer, and fully connected layers. The convolutional neural network has a structure suitable for training and inference of two-dimensional data, and can be trained through a backpropagation algorithm.

In the example of the present disclosure, a kernel for extracting a feature of an input image of a channel exists for each channel of the convolutional neural network. The kernel may be composed of a two-dimensional matrix. The kernel performs convolution while traversing the input data. The size of the kernel (N×M) may be arbitrarily determined, and the stride at which the kernel traverses the input data may also be arbitrarily determined. The degree of matching of the kernel to all input data per one kernel may be a feature map or an activation map. Hereinafter, the kernel may include a set of weight values or a plurality of sets of weight values.

The processing element array 100, i.e., a plurality of processing elements, may be configured to process a convolution operation of an artificial neural network, and the activation function operation may be configured to be processed in a separate activation function processing module. In this case, the processing element array 100 may be operated only for convolutional operations. In particular, in this case, the processing element array 100 is configured to process only integer type data, so that it is possible to maximize arithmetic efficiency during a massive convolution operation.

Since the convolution operation is an operation consisting of a combination of input data and a kernel, an activation function such as ReLU for adding nonlinearity may be applied thereafter. When an activation function is applied to a feature map that is a result of a convolution operation, it may be referred to as an activation map.

Convolutional neural networks may include Alexnet, Squeezenet, VGG16, Resnet152, Moblienet, and the like. The number of multiplications required for one inference in each neural network model is 727 MFLOPs, 837 MFLOPs, 16 MFLOPs, 11 MFLOPs, 11 MFLOPs, and 579 MFLOPs, respectively, and the data size of all weights including the kernel is 233 MB, 5 MB, 528 MB, 230 MB, 16 MB, respectively. So, it can be seen that a fairly large amount of hardware resources and power consumption are required.

An activation function processing unit may be further disposed between the processing element array 100 and the internal memory 200 to apply the activation function. The activation function processing unit may be configured to include a plurality of sub-modules. For example, the activation function processing unit may include at least one of ReLU unit, Leaky-ReLU unit, ReLU6 unit, Swish unit, Sigmoid unit, Average-Pooling unit, Skip-Connection unit, Squeeze and Excitation unit, Bias unit, Quantization unit, Dequantization unit, Hyperbolic-Tangent unit, Maxout unit, ELU unit, Batch-Normalization unit, and Piecewise-Function-Approximation unit. The activation function processing unit may be configured to arrange each sub-module in a pipeline structure.

The activation function processing unit may selectively activate or deactivate each sub-module.

The NPU scheduler 300 may be configured to control the activation function processing unit.

The NPU scheduler 300 may selectively activate or deactivate each sub-module of the activation function processing unit based on the data locality of the artificial neural network model.

The activation function processing unit may be configured to sequentially process the feature map of each batch channel output from the processing element array 100 to output an activation map of each batch channel. This will be described in detail with reference to FIG. 2B.

Figure 2B:
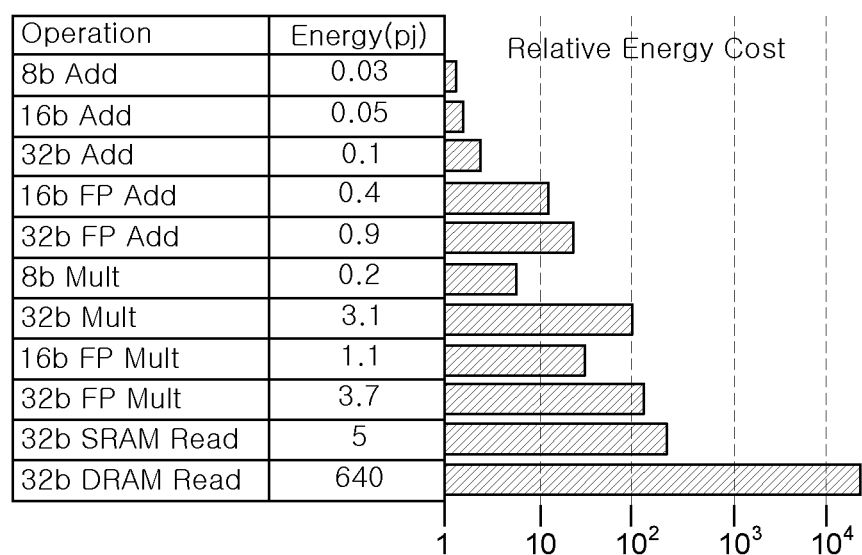
FIG. 2B is an exemplary view showing energy consumed during operation of the NPU.

FIG. 2B shows energy consumed during operation of the NPU 1000. The presented example will be described with reference to the configurations (e.g., the multiplier 641 and the adder 642) of the first processing element PE1 110 of FIG. 2C, which will be described later.

Referring to FIG. 2B, energy consumption may be divided into memory access operation, addition operation, and multiplication operation.

"8b Add" refers an 8-bit integer addition operation of the adder 642. An 8-bit integer addition operation may consume 0.03 pj of energy.

"16b Add" refers to the 16-bit integer addition operation of the adder 642. A 16-bit integer addition operation may consume 0.05 pj of energy.

"32b Add" refers a 32-bit integer addition operation of the adder 642. A 32-bit integer addition operation may consume 0.1 pj of energy.

"16b FP Add" refers a 16-bit floating-point addition operation of the adder 642. A 16-bit floating-point addition operation may consume 0.4 pj of energy.

"32b FP Add" refers a 32-bit floating-point addition operation of the adder 642. A 32-bit floating-point addition operation may consume 0.9 pj of energy.

"8b Mult" refers an 8-bit integer multiplication operation of the multiplier 641. An 8-bit integer multiplication operation may consume 0.2 pj of energy.

"32b Mult" refers a 32-bit integer multiplication operation of the multiplier 641. A 32-bit integer multiplication operation may consume 3.1 pj of energy.

"16b FP Mult" refers a 16-bit floating-point multiplication operation of the multiplier 641. A 16-bit floating-point multiplication operation may consume 1.1 pj of energy.

"32b FP Mult" refers a 32-bit floating-point multiplication operation of the multiplier 641. A 32-bit floating-point multiplication operation may consume 3.7 pj of energy.

"32b SRAM Read" refers to 32-bit data read access when the internal memory of the NPU memory system is a static random-access memory (SRAM). To read 32-bit data from the NPU memory system may consume 5 pj of energy.

"32b DRAM Read" means 32-bit data read access when the storage unit of the vehicle control device is DRAM. Reading 32-bit data from the storage unit to the NPU memory system can consume 640 pj of energy. The energy unit is the pico-joule (pj).

The conventional neural processing unit stores these kernels in a memory for each corresponding channel, and processes input data by fetching them from the memory for each convolution process. For example, in the 32-bit read operation of the convolution process, the SRAM, which is the internal memory of the NPU 1000, consumes 5 pj of power as shown in FIG. 2B, and the DRAM as the main memory consumes 640 pj of power. These memories consumed 0.03 pj of power in 8-bit addition operation, 0.05 pj of power in 16-bit addition, 0.1 pj of power in 32-bit addition, and 0.2 pj of power in 8-bit multiplication. As such, the conventional neural processing unit consumes considerably more power than do other operations, thereby causing overall performance degradation. That is, power consumed when the kernel is read from the main memory of the NPU 1000 is 128 times higher than the power consumed when the kernel is read from the internal memory.

That is, the operating speed of the main memory 4000 is slower than that of the internal memory 200, but the power consumption per unit operation is relatively large. Therefore, minimizing the read operation of the main memory 4000 may affect power consumption reduction of the NPU 1000. In particular, if a plurality of channels is individually processed, the power consumption efficiency may be particularly deteriorated.

In order to overcome this inefficiency, the present disclosure proposes a neural processing unit with improved computational performance by minimizing data movement between the main memory 4000 and the on-chip area A that loads a set of weight values or a plurality of batch channels, thereby reducing overall hardware resources and power consumption due to data movement.

The use of batch channels as input to perform object detection using the object detection model in the neural processing unit is to minimize the number of times that the weight value of the object detection model is accessed from DRAM. As the number (size) of batch data increases, the number of accesses to the weight values stored in the DRAM increases. That is, the number of accesses to the weight value stored in the DRAM may increase in proportion to the number of batch channels.

Accordingly, the present disclosure stores a necessary portion of the data on the object detection model used for object detection in the NPU internal memory composed of SRAM, thereby reducing energy consumption per unit operation of the NPU and further improving the performance of the NPU.

Accordingly, an autonomous driving vehicle equipped with the NPU of the present disclosure can minimize the amount of time required for recognizing target objects around front, rear, left and right sides of the vehicle, obstacles, signal information of traffic lights, and pedestrians, which must be recognized in real time for safe autonomous driving of the vehicle, and the computational resources consumed for object detection.

Hereinafter, the first processing element PE1 of FIG. 2A of the processing element array will be described as an example in order for the neural processing unit to reduce overall hardware resources and power consumption due to data movement and to have improved computational performance.

The NPU 1000 may include a processing element array 100, an NPU internal memory 200 configured to store an artificial neural network model that can be inferred from the processing element array 100, and an NPU scheduler 300 configured to control processing element array 100 and NPU internal memory 200. The processing element array 100 may be configured to perform a MAC operation and to quantize and output a MAC operation result. However, examples of the present disclosure are not limited thereto.

The NPU internal memory 200 may store all or part of the artificial neural network model according to the memory size and the data size of the artificial neural network model.

Figure 2C:
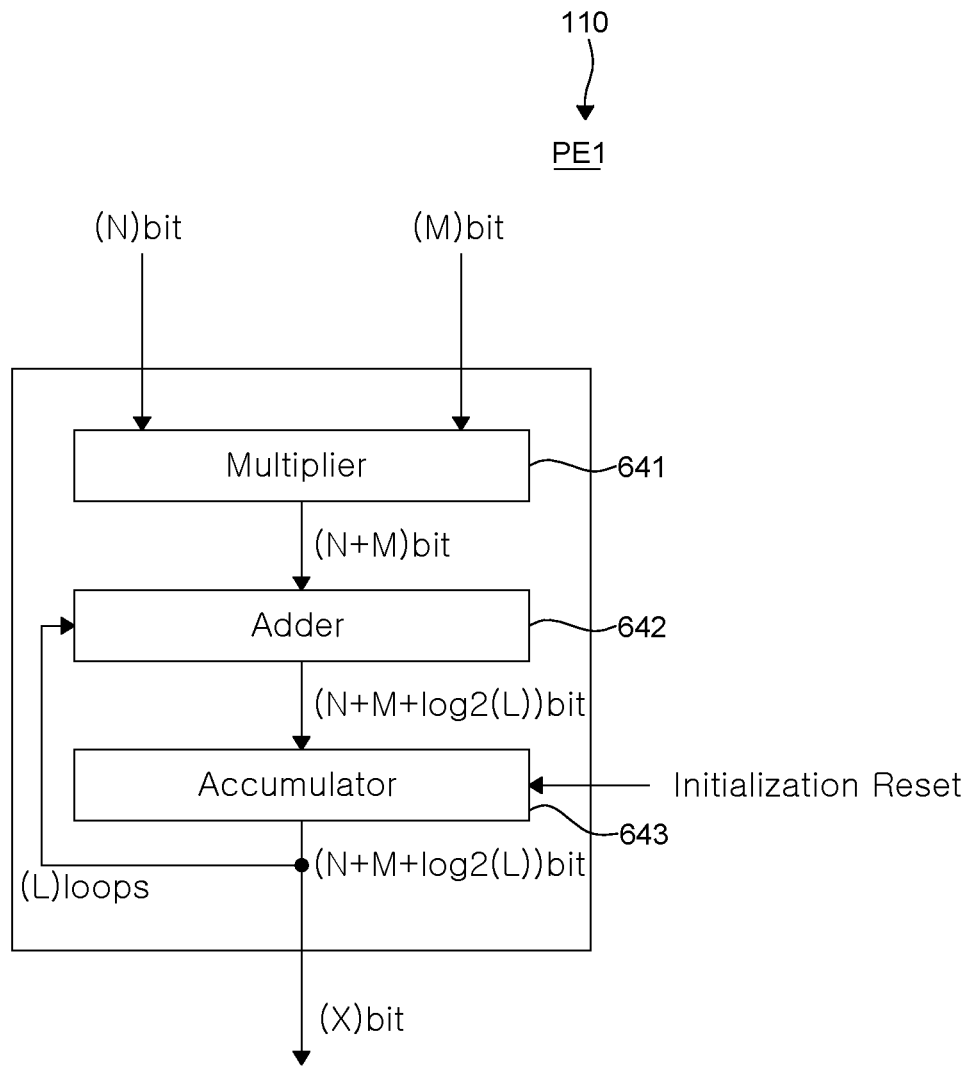
FIG. 2C is a schematic conceptual diagram illustrating one processing element of a plurality of processing elements that may be applied to the present disclosure.

FIG. 2C illustrates one processing element of a plurality of processing elements that may be applied to the present disclosure.

Referring to FIG. 2C, the first processing element PE1 may include a multiplier 641, an adder 642, and an accumulator 643. However, examples according to the present disclosure are not limited thereto, and the processing element array 100 may be modified in consideration of the computational characteristics of the artificial neural network.

The multiplier 641 multiplies the received N-bit data and M-bit data. The operation value of the multiplier 641 is output as (N+M) bit data, where N and M are integers greater than zero. The first input unit receiving N bit data may be configured to receive a value having a characteristic such as a variable, and the second input unit receiving the M bit data may be configured to receive a value having a characteristic such as a constant.

Here, a value having a variable-like characteristic, or a variable, means that a value of a memory address in which the corresponding value is stored is updated whenever incoming input data is updated. For example, the node data of each layer may be a MAC operation value in which the weight data of the artificial neural network model is applied. In the case of inferring object detection of moving image data with the corresponding artificial neural network model, since the input image changes every frame, the node data of each layer changes.

Here, a value having constant-like characteristics, or a constant, means that the value of the memory address in which the corresponding value is stored is preserved regardless of the update of incoming input data. For example, the weight data of the connection network is a unique inference determination criterion of the artificial neural network model, and even if object detection of moving image data is inferred by the artificial neural network model, the weight data of the connection network (i.e., kernel) may not change.

That is, the multiplier 641 may be configured to receive one variable and one constant. In more detail, the variable value input to the first input unit may be node data of the layer of the artificial neural network, and the node data may be input data of the input layer of the artificial neural network, the accumulated value of the hidden layer, and the accumulated value of the output layer. The constant value input to the second input unit may be weight data of a connection network of an artificial neural network.

As such, when the NPU scheduler 300 distinguishes the characteristics of the variable value and the constant value, the NPU scheduler 300 may increase the memory reuse rate of the NPU internal memory 200. However, the input data of the multiplier 641 is not limited to constant values and variable values. That is, according to the examples of the present disclosure, since the input data of the processing element may operate by understanding the characteristics of the constant value and the variable value, the operation efficiency of the NPU 1000 may be improved. However, the operation of the NPU 1000 is not limited to the characteristics of constant values and variable values of input data.

Based on this, the NPU scheduler 300 may be configured to improve the memory reuse rate in consideration of the characteristics of the constant value.

The variable value is the calculated value of each layer, and the NPU scheduler 300 may control the NPU internal memory 200 to recognize reusable variable values and reuse the memory based on the artificial neural network model structure data or the artificial neural network data locality information.

The constant value is the weight data of each network, and the NPU scheduler 300 may control the NPU internal memory 200 to recognize the constant value of the repeatedly used connection network and reuse the memory based on the artificial neural network model structure data or the artificial neural network data locality information.

That is, the NPU scheduler 300 recognizes reusable variable values and/or reusable constant values based on structure data or artificial neural network data locality information of an artificial neural network model, and the NPU scheduler 300 may be configured to control the NPU internal memory 200 to reuse the data stored in memory.

When zero is inputted to one of the first input unit and the second input unit of the multiplier 641, the first processing element PE1 knows that the result of the operation is zero even if it does not perform the operation. Thus, the operation of the multiplier 641 may be limited so that the operation is not performed.

For example, when zero is inputted to one of the first input unit and the second input unit of the multiplier 641, the multiplier 641 may be configured to operate in a zero-skipping manner.

The number of bits of data input to the first input unit and the second input unit may be determined according to quantization of node data and weight data of each layer of the artificial neural network model. For example, node data of the first layer may be quantized to five bits and weight data of the first layer may be quantized to seven bits. In this case, the first input unit may be configured to receive five-bit data, and the second input unit may be configured to receive seven-bit data.

The NPU 1000 may control the number of quantized bits to be converted in real time when the quantized data stored in the NPU internal memory 200 is input to the inputs of the first processing element PE1. That is, the number of quantized bits can be different for each layer, and when the number of bits of input data is converted, the first processing element PE1 may be configured to receive bit number information from the NPU 1000 in real time and convert the number of bits in real time to generate input data.

The adder 642 adds the calculated value of the multiplier 641 and the calculated value of the accumulator 643. When L loops is 0, since there is no accumulated data, the operation value of the adder 642 may be the same as the operation value of the multiplier 111. When L loops is 1, a value obtained by adding an operation value of the multiplier 641 and an operation value of the accumulator 643 may be an operation value of the adder.

The accumulator 643 temporarily stores the data output from the output unit of the adder 642 so that the operation value of the adder 642 and the operation value of the multiplier 641 are accumulated by the number of L loops. Specifically, the calculated value of the adder 642 output from the output unit of the adder 642 is input to the input unit of the accumulator 643. The operation value input to the accumulator is temporarily stored in the accumulator 643 and is output from the output unit of the accumulator 643. The output operation value is input to the input unit of the adder 642 by a loop. At this time, the operation value newly output from the output unit of the multiplier 641 is inputted to the input unit 642 of the adder. That is, the operation value of the accumulator 643 and the new operation value of the multiplier 641 are input to the input unit of the adder 642, and these values are added by the adder 642 and outputted through the output unit of the adder 642. The data output from the output unit of the adder 642, that is, a new operation value of the adder 642, is input to the input unit of the accumulator 643, and subsequent operations are performed substantially the same as the above-described operations as many times as the number of loops.

As such, the accumulator 643 temporarily stores the data output from the output unit of the adder 642 in order to accumulate the operation value of the multiplier 641 and the operation value of the adder 642 by the number of loops. Accordingly, data input to the input unit of the accumulator 643 and data output from the output unit may have the same bit width as the data output from the output unit of the adder 642, which is (N+M+log 2(L)) bits, where L is an integer greater than 0.

When the accumulation is finished, the accumulator 643 may receive an initialization reset signal to initialize the data stored in the accumulator 643 to zero. However, examples according to the present disclosure are not limited thereto.

The output data of (N+M+log 2(L)) bits of the accumulator 643 may be node data of a next layer or input data of a convolution.

In various examples, the first processing element PE1 may further include a bit quantization unit. The bit quantization unit may reduce the number of bits of data output from the accumulator 643. The bit quantization unit may be controlled by the NPU scheduler 300. The number of bits of the quantized data may be output as X bits, where X is an integer greater than zero. According to the above configuration, the processing element array 100 is configured to perform a MAC operation, and the processing element array 100 has an effect of quantizing and outputting the MAC operation result. In particular, such quantization has the effect of further reducing power consumption as the number of L loops increases. In addition, if the power consumption is reduced, there is an effect that the heat generation of the edge device can also be reduced. In particular, reducing heat generation has an effect of reducing the possibility of malfunction due to high temperature of the NPU 1000.

The output data of X bits of the bit quantization unit may be node data of a next layer or input data of convolution. If the artificial neural network model has been quantized, the bit quantization unit may be configured to receive quantized information from the artificial neural network model. However, it is not limited thereto, and the NPU scheduler 300 may be configured to extract quantized information by analyzing the artificial neural network model. Therefore, the output data of X bits may be converted into the quantized number of bits to correspond to the quantized data size and output. The output data of X bits of the bit quantization unit may be stored in the NPU internal memory 200 as the number of quantized bits. The bit quantization unit may be included in a processing element or an activation function processing unit.

The processing element array 100 of the NPU 1000 according to an example of the present disclosure may reduce the number of bits of (N+M+log 2 (L)) bit data output from the accumulator 643 by the bit quantization unit to the number of bits of X bit data. The NPU scheduler 300 may control the bit quantization unit to reduce the number of bits of the output data by a predetermined bit from a least significant bit (LSB) to a most significant bit (MSB). When the number of bits of output data is reduced, power consumption, calculation amount, and memory usage of the NPU 1000 may be reduced. However, when the number of bits is reduced below a specific length, there may be a problem in that the inference accuracy of the artificial neural network model may be rapidly reduced. Accordingly, the reduction in the number of bits of the output data, that is, the quantization degree, can be determined by comparing the reduction in power consumption, the amount of computation, and the amount of memory usage compared to the reduction in inference accuracy of the artificial neural network model. It is also possible to determine the quantization degree by determining the target inference accuracy of the artificial neural network model and testing it while gradually reducing the number of bits. The quantization degree may be determined for each operation value of each layer.

According to the above-described first processing element PE1, by adjusting the number of bits of N-bit data and M-bit data of the multiplier 641 and reducing the number of bits of the operation value X bit by the bit quantization unit, a processing element has the effect of reducing power consumption while improving the MAC operation speed, and has the effect of more efficiently performing the convolution operation of the artificial neural network.

However, the bit quantization unit of the present disclosure may be configured to be included in the activation function processing unit rather than the processing element.

Accordingly, the NPU internal memory 200 of the NPU 1000 may be a memory system configured in consideration of the MAC operation characteristics and power consumption characteristics of the processing element array 100.

For example, the NPU 1000 may be configured to reduce the bit width of the operation value of the processing element array 100 in consideration of the MAC operation characteristics and power consumption characteristics of the processing element array 100.

NPU internal memory 200 of the NPU 1000 may be configured to minimize the power consumption of the NPU 1000.

The NPU internal memory 200 of the NPU 1000 may be a memory system configured to control the memory with low power in consideration of the size and operation step of the parameters of the artificial neural network model to be operated.

The NPU internal memory 200 of the NPU 1000 may be a low-power memory system configured to reuse a specific memory address in which weight data is stored in consideration of the data size and operation step of the artificial neural network model.

The NPU 1000 may provide various activation functions for imparting non-linearity. For example, the activation function may include a sigmoid function, a hyperbolic tangent (tanh) function, a ReLU function, a Leaky-ReLU function, a Maxout function, or an ELU function that derives a non-linear output value with respect to an input value, but it is not limited thereto. Such activation function may be selectively applied after MAC operation. The operation value to which the activation function is applied may be referred to as an activation map. The calculated value before the activation function is applied may be referred to as a feature map.

Figure 3:
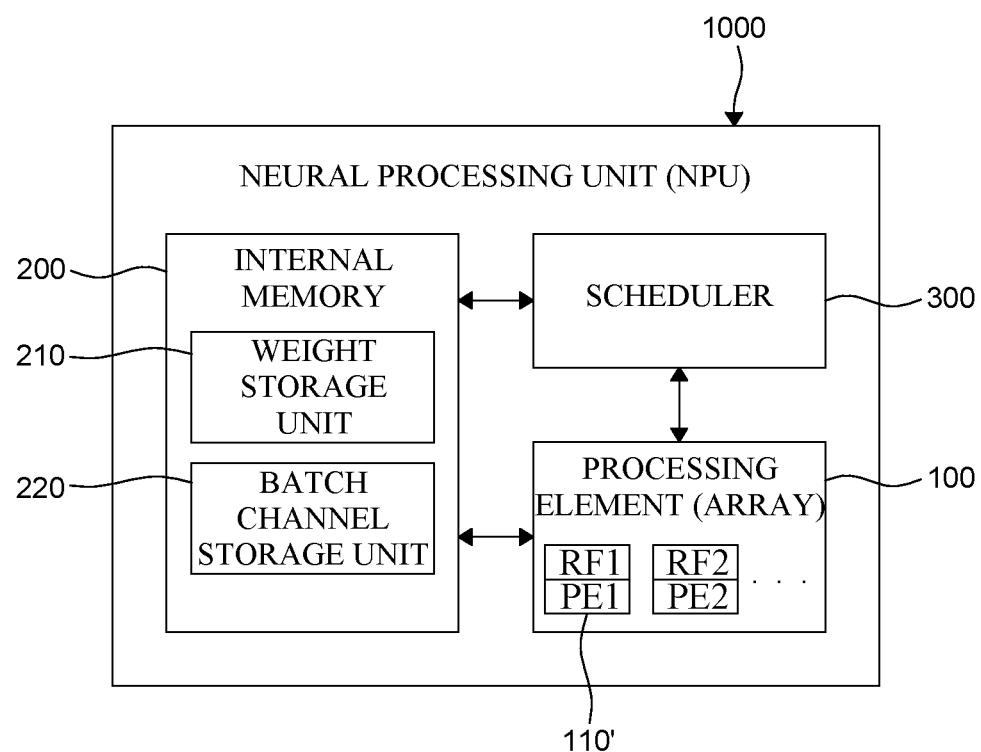
FIG. 3 is an exemplary view showing a modified example of the NPU shown in FIG. 2A.

FIG. 3 shows a modified example of the NPU shown in FIG. 2A.

The NPU 1000 shown in FIG. 3 is substantially the same as compared to the processing unit 1000 exemplarily shown in FIG. 2A, except for the plurality of processing elements 110. Thus, redundant description is omitted merely for convenience of description.

In addition to the plurality of processing elements 110', the processing element array 100 exemplarily illustrated in FIG. 3 may include respective register files RF1, RF2, ... corresponding to each of the processing elements PE1, PE2, . . . .

The plurality of processing elements PE1, PE2, . . . and the plurality of register files RF1, RF2, . . . illustrated in FIG. 3 are merely examples for convenience of description, and the numbers of the plurality of processing elements and the plurality of register files are not limited thereto.

The size or number of the processing element array 100 may be determined by the number of the plurality of processing elements PE1, PE2, . . . and the plurality of register files RF1, RF2, . . . . The size of the processing element array 100 and the plurality of register files RF1, RF2, . . . may be implemented in the form of an N×M matrix, where N and M are integers greater than zero.

The array size of the processing element array 100 may be designed in consideration of the characteristics of the artificial neural network model in which the NPU 1000 operates. In other words, the memory size of the register file may be determined in consideration of the data size of the artificial neural network model to be operated, the required operating speed, the required power consumption, and the like.

The register files RF1, RF2, . . . of the processing element array 100 are static memory units directly connected to the processing elements PE1 to PE12. The register files RF1, RF2, . . . may be composed of, for example, flip-flops and/or latches. The register files RF1, RF2, . . . may be configured to store the MAC operation value of the corresponding processing elements PE1, PE2, . . . . The register files RF1, RF2, . . . may be configured to provide or receive the NPU system memory 200 and weight data and/or node data. It is also possible that the register files RF1, RF2, . . . are configured to perform the function of an accumulator.

An activation function processing unit may be further provided and disposed between the processing element array 100 and the internal memory 200 to apply the activation function.

Figure 4:
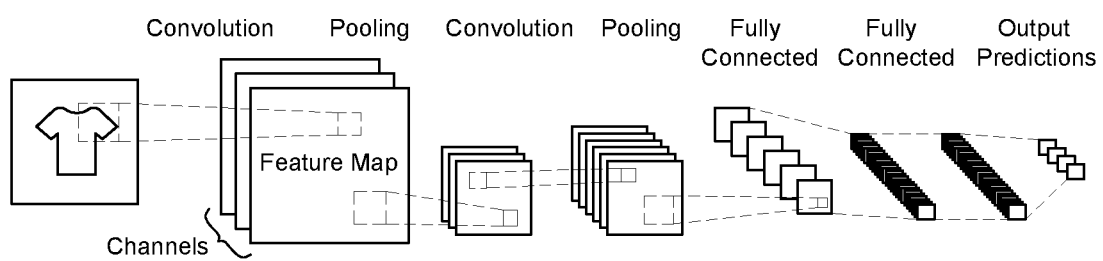
FIG. 4 is a schematic conceptual diagram illustrating an exemplary artificial neural network model.

FIG. 4 illustrates an exemplary artificial neural network model.

Referring to FIG. 4, the convolutional neural network may include at least one convolutional layer, at least one pooling layer, and at least one fully connected layer.

For example, a convolution may be defined by two main parameters that the size of the input data (typically a 1×1, 3×3 or 5×5 matrix) and the depth of the output feature map (the number of kernels). These key parameters can be computed by convolution. These convolutions may start at depth 32, continue to depth 64, and end at depth 128 or 256. The convolution operation may be referred to as an operation of sliding a kernel of size 3×3 or 5×5 over the input image matrix, which is the input data, multiplying each element of the kernel and each element of the input image matrix that overlaps, and then adding them all together. Here, the input image matrix may be referred to as a 3D patch, and the kernel may be referred to as a trainable weight matrix.

In other words, convolution refers to an operation in which a three-dimensional patch is converted into a one-dimensional vector by tensor product with a trained weight matrix, and the vector is spatially reassembled into a three-dimensional output feature map. All spatial locations of the output feature map may correspond to the same location of the input feature map.

The convolution layer can perform convolution between the input data and the kernel (i.e., the weight matrix) trained over many iterations of the gradient update during the learning process. If (m, n) is the kernel size and W is set as the weight value, the convolution layer can perform convolution of the input data and the weight matrix by calculating the dot product.

The step size that the kernel slides across the input data is called the stride, and the kernel area (m×n) can be called the receptive field. The same convolutional kernel is applied across different locations of the input, which reduces the number of training kernels. This also enables position invariant learning, where if a significant pattern is present in the input, the convolution filter (i.e., the kernel) can learn that pattern regardless of the position of the sequence.

An activation function may be applied to the output feature map generated as described above to finally output the activation map. In addition, the feature map calculated in the current layer may be transmitted to the next layer through convolution. The pooling layer may perform a pooling operation to reduce the size of the feature map by down sampling the output data (i.e., the activation map). For example, the pooling operation may include, but is not limited thereto, max pooling and/or average pooling. The maximum pooling operation uses the kernel, and outputs the maximum value in the area of the feature map overlapping the kernel by sliding the feature map and the kernel. The average pooling operation outputs the average value within the area of the feature map overlapping the kernel by sliding the feature map and the kernel. As such, since the size of the feature map is reduced by the pooling operation, the number of weights of the feature map is also reduced.

The fully connected layer may classify data output through the pooling layer into a plurality of classes (i.e., inferenced values), and may output the classified class and a score thereof. Data output through the pooling layer forms a three-dimensional feature map, and this three-dimensional feature map can be converted into a one-dimensional vector and input as a fully connected layer.

A convolutional neural network can be tuned or trained so that input data leads to specific inferenced output. In other words, a convolutional neural network can be tuned using backpropagation based on comparisons between the inferenced output and the ground truth until the inferenced output progressively matches or approximates the ground truth.

A convolutional neural network can be trained by adjusting the weights between neurons based on the difference between the ground truth data and the actual output.

Hereinafter, a method for a neural processing unit to perform operations on an ANN according to various examples of the present disclosure and a memory space to which artificial neural network parameters are allocated according to steps will be described with reference to FIGS. 5 to 12.

Hereinafter, weights and batch channels A to D are referred to, and their sizes and divisions are merely exemplary, and for convenience of description, they are illustrated to have the same size or a relative size to each other. In addition, weights and batch channels have an address allocated to the memory space, respectively, and data flow as shown in FIGS. 5 to 12 may refer to writing alternative data to the memory address. Data in the same location in the same category is intended to be maintained without overwriting other data. In addition, each operation step should be interpreted as a calculation time for at least one clock cycle, but is not limited thereto, and may be performed for variable clock cycles, and it is not intended that each operation step is performed during the same clock cycles. It should also be noted that each operation step is a state for a very short time of memory and is not a statically latched state.

Moreover, spaces of memory are illustratively shown as having the same partition or size, but is not limited thereto, and spaces of memory may have various partitions (e.g., fragmented partitions) and may have different sizes. Also, in this example, S may refer to an operation step (i.e., a step).

In this example, the ANN is configured to perform at least one operation including object detection, classification or segmentation from a plurality of batch channels. A plurality of batch channels may be pre-processed before operations on the ANN, and each of the plurality of batch channels corresponds to each of a plurality of images.

Figure 5:
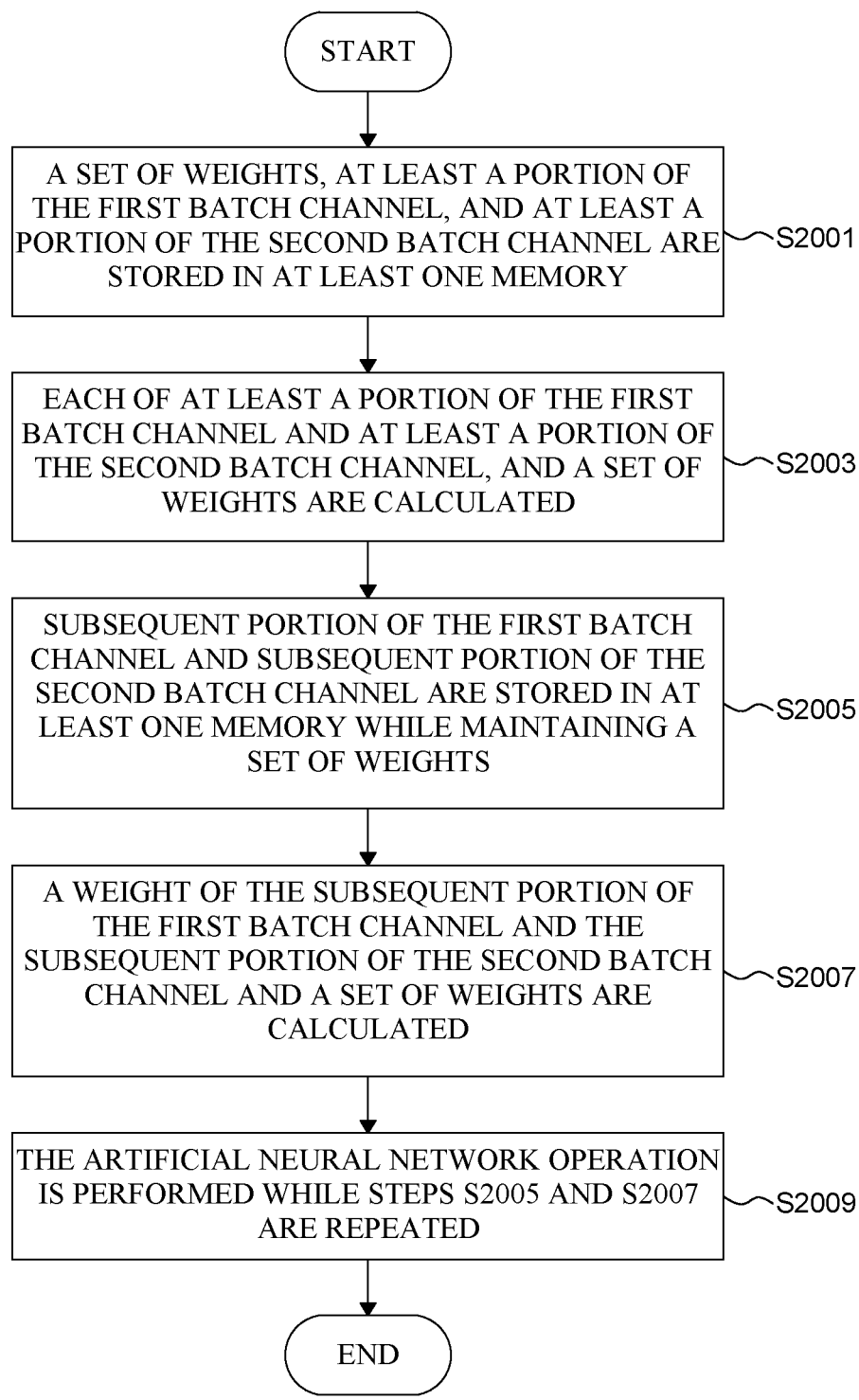
FIG. 5 is an exemplary flowchart illustrating how a neural processing unit (NPU) operates according to an example of the present disclosure.
Figure 6:
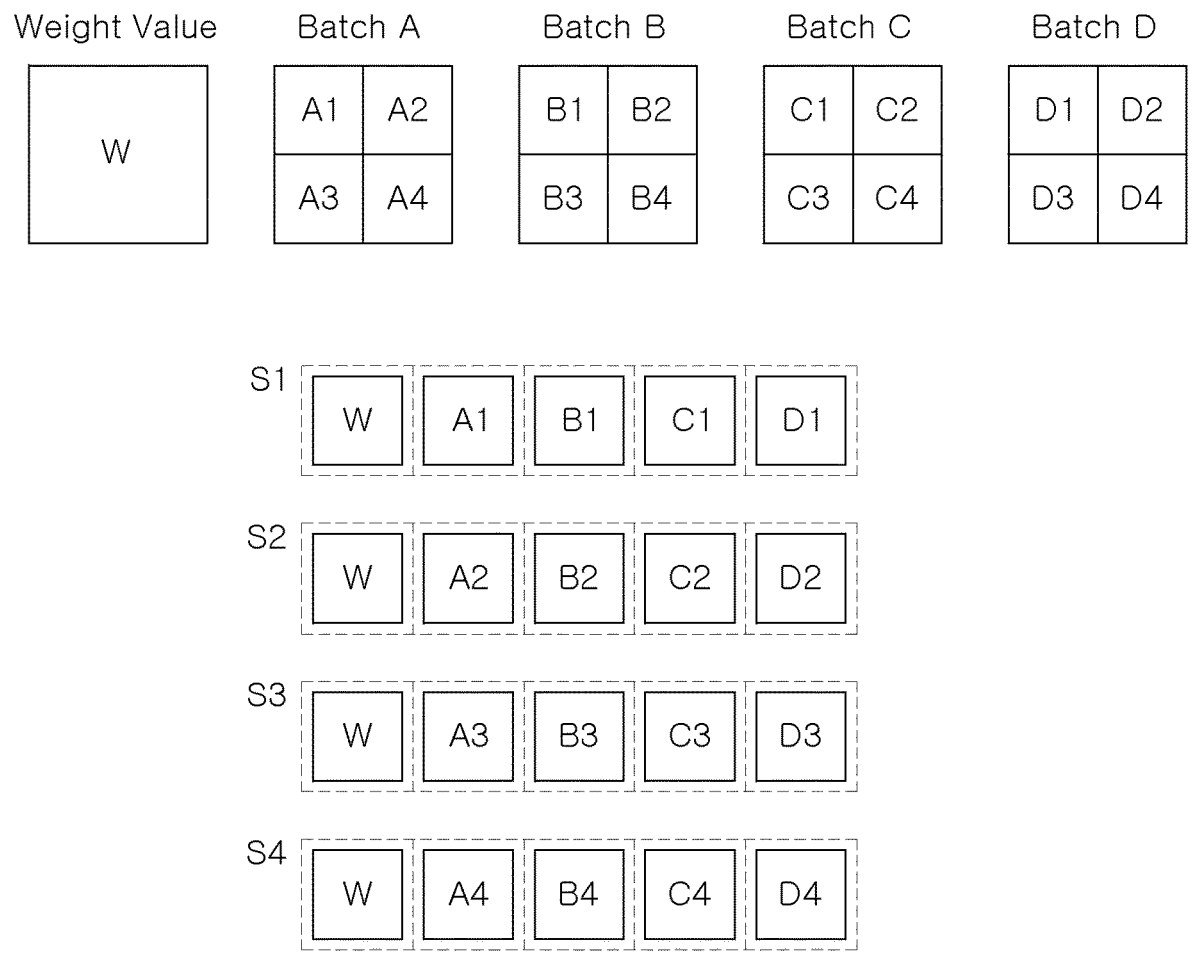
FIG. 6 is an exemplary schematic diagram illustrating allocation of artificial neural network parameters in a memory space in an NPU according to the example of FIG. 5.

FIG. 5 illustrates how a neural processing unit operates according to an example of the present disclosure. FIG. 6 illustrates a memory space to which artificial neural network parameters are allocated in a neural processing unit according to steps of FIG. 5.

In the presented example, the plurality of batch channels may include a first batch channel Batch A, a second batch channel Batch B, a third batch channel Batch C, and a fourth batch channel Batch D. For example, each batch channel may be divided into four portions (or a part of four portions). Each of these batch channels may contain a complete data set.

First, referring to FIG. 5, a set of weights, at least a portion of the first batch channel, and at least a portion of the second batch channel are stored in at least one memory (S2001). Here, a set of weights means a weight matrix kernel including at least one weight value, and the memory may be the internal memory 200, an on-chip memory, or a main memory.

Before being stored in the at least one memory in this example, the size of the set of weights, the size of at least a portion of the first batch channel, and the size of at least a portion of the second batch channel may be adjusted to fit into the at least one memory.

In this example, the size of at least a portion of the first batch channel may be less than or equal to the size of the at least one memory divided by the number of the plurality of batch channels. Also, the size of at least one internal memory may correspond to the largest feature map size of the ANN and the number of batch channels. In this example, at least one internal memory may store compressed parameters of the ANN.

In more detail, the size of the at least one memory may be determined in consideration of the data size of a specific ANN parameter to be processed by the neural processing unit 1000 and the number of batch channels.

Next, each of at least a portion of the first batch channel and at least a portion of the second batch channel, and a set of weights are calculated (S2003). The calculation may correspond to, for example, a convolution operation according to an interval.

Next, the subsequent portion of the first batch channel and the subsequent portion of the second batch channel are stored in at least one memory while maintaining a set of weights (S2005), and then a weight of the subsequent portion of the first batch channel and the subsequent portion of the second batch channel and a set of weights are calculated (S2007).

After that, the artificial neural network operation is performed while steps S2005 and S2007 are repeated (S2009).

Specifically, referring to FIG. 6, in this example, it is assumed that the memory has five memory spaces. Also, in this example, it is assumed that a set of weights includes a weight W, the first batch channel Batch A includes A1, A2, A3, and A4, the second batch channel Batch B includes B1, B2, B3, and B4, the third batch channel Batch C includes C1, C2, C3, and C4, and the fourth batch channel Batch D includes D1, D2, D3, and D4.

Referring to FIG. 6, in S1, weights W, the first portion A1 of the first batch channel, the first portion B1 of the second batch channel, the first portion C1 of the third batch channel, and the first portion D1 of the fourth batch channel are filled in the five memory spaces. The processing element PE performs a calculation for the weights W and each first portion of the first, second, third and fourth batch channels. Here, the weight W may be a weight matrix including at least one weight value.

In S2, the weight W is maintained as in S1, while the second portion A2 of the first batch channel, the second portion B2 of the second batch channel, the second portion C2 of the third batch channel, and the second portion D2 of the fourth batch channel are filled in the corresponding memory spaces. The processing element PE performs a calculation for the weights W and each second portion of the first, second, third and fourth batch channels.

In S3, the weight W is maintained as in S1, while the third portion A3 of the first batch channel, the third portion B3 of the second batch channel, the third portion C3 of the third batch channel, and the third portion D3 of the fourth batch channel are filled in the corresponding memory spaces. The processing element PE performs a calculation for the weights W and each third portion of the first, second, third, and fourth batch channels.

In S4, the weight W is maintained as in S1, while the fourth portion A4 of the first batch channel, the fourth portion B4 of the second batch channel, the fourth portion C4 of the third batch channel, and the fourth portion D4 of the fourth batch channel are filled in the corresponding memory spaces. The processing element PE performs a calculation for the weights W and each fourth portion of the first, second, third and fourth batch channels.

When the calculation of the first, second, third, and fourth batch channels is completed, a feature map may be generated, and an activation function may be selectively applied to generate an activation map. The feature map or activation map generated in this way may be input to a convolution layer for another convolution operation, input to a pooling layer for a pooling operation, or input as a fully connected layer for classification, but is not limited thereto. These calculations may be performed by the processing element PE as described above.

As such, the processing element PE calculates each of the plurality of batch channels and a set of weights maintained in a memory (i.e., an internal memory). That is, it is possible to reuse at least one kernel or a set of weight values corresponding to a plurality of feature maps of the plurality of batch channels, respectively, by maintaining the at least one kernel or the set of weight values until completing calculation of the corresponding feature maps of the plurality of batch channels.

The batch mode of the operation method proposed in FIGS. 5 and 6 may be described as a method of tiling only the feature map for each layer of each batch channel, and may be referred to as a first batch mode. The first batch mode may be utilized when the parameter size of the feature map among the layers of the artificial neural network model is relatively larger than the parameter size of the kernel.

Meanwhile, in a related art, each time a plurality of consecutive data or continuous image data is processed, a weight is newly accessed for each operation. Such conventional methodology is inefficient.

On the other hand, the neural processing unit according to the present disclosure maintains the weights in memory, whereby unnecessary access operations of the weights are minimized, thereby improving processing speed and reducing energy consumed. In the present example, the memory has the same performance improvement and energy reduction effect in the case of on-chip memory as well as the NPU internal memory.

Figure 7:
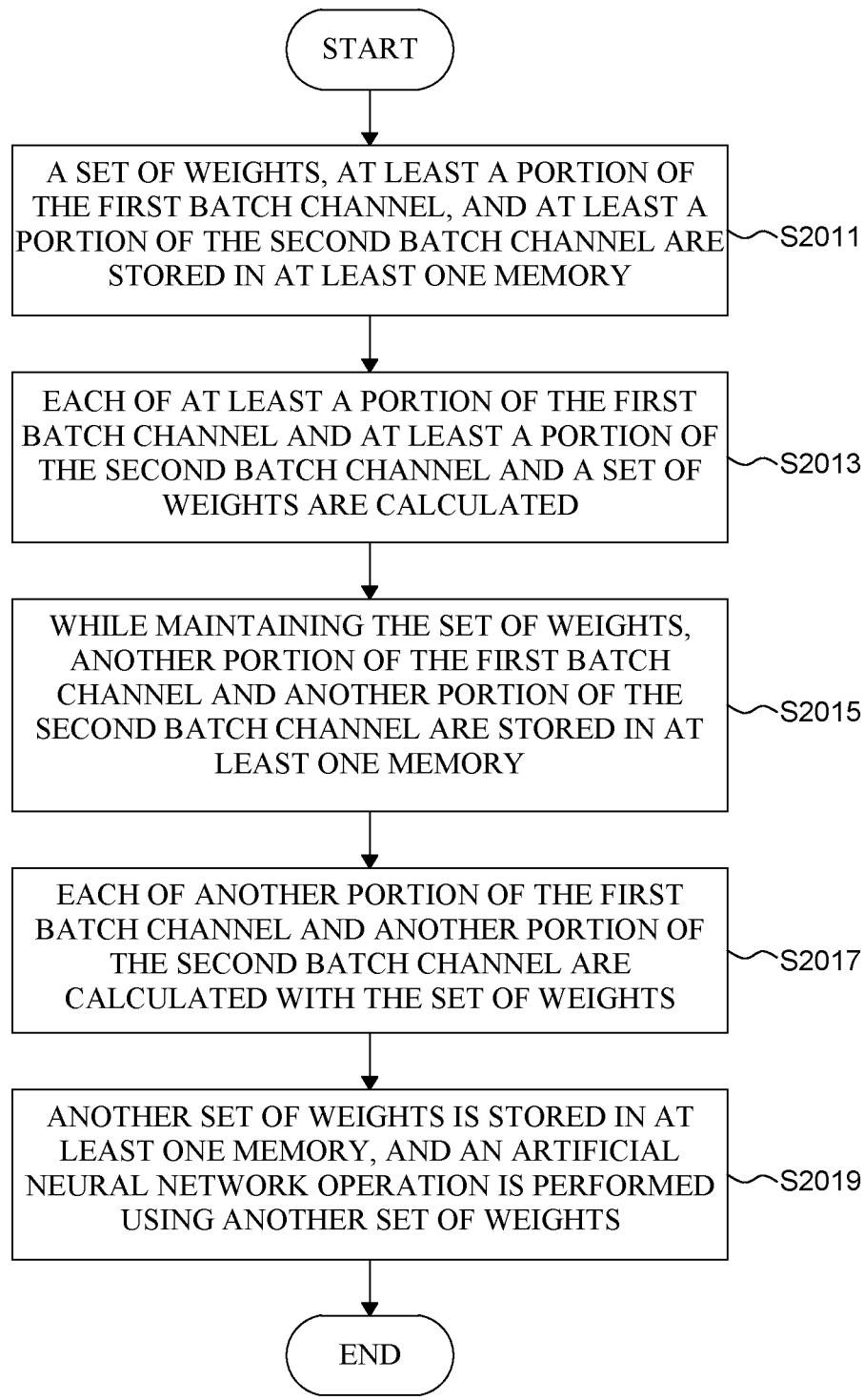
FIG. 7 is an exemplary flowchart illustrating how a neural processing unit operates according to another example of the present disclosure.
Figure 8:
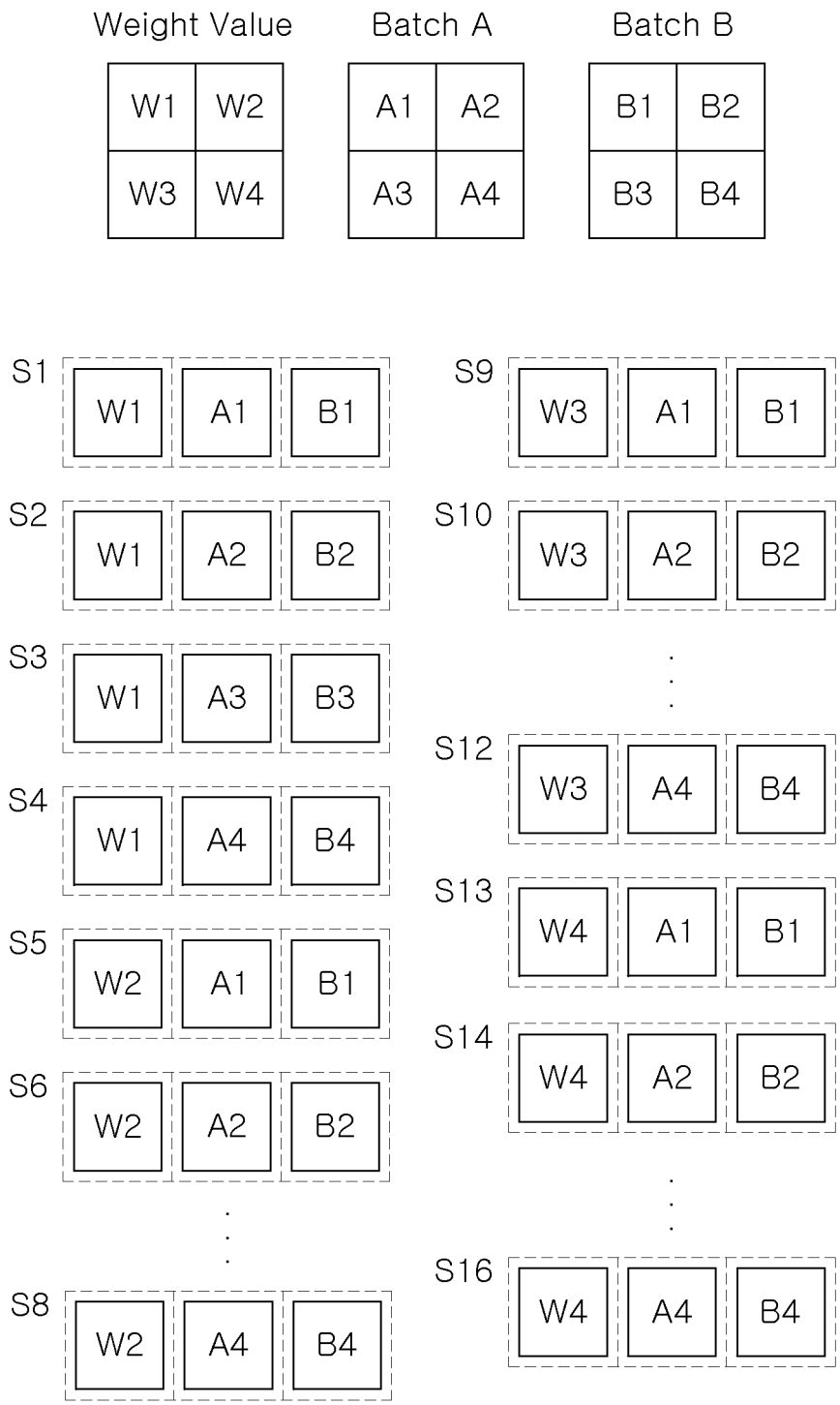
FIG. 8 is an exemplary schematic diagram illustrating allocation of artificial neural network parameters in a memory space in an NPU according to the example of FIG. 7.

FIG. 7 illustrates how a neural processing unit operates according to another example of the present disclosure. FIG. 8 illustrates a memory space to which artificial neural network parameters are allocated in a neural processing unit according to steps according to steps of FIG. 7.

In the present example, the plurality of batch channels may include a first batch channel Batch A and a second batch channel Batch B. For example, each batch channel may be divided into four portions (or a part of four portions).

First, referring to FIG. 7, a set of weights, at least a portion of the first batch channel, and at least a portion of the second batch channel are stored in at least one memory (S2011). Here, the set of weights may be referred to as at least one weight value among weight matrices including at least one weight value. The memory may also be an internal memory, an on-chip memory, or a main memory.

Next, each of at least a portion of the first batch channel and at least a portion of the second batch channel and a set of weights are calculated (S2013). The calculation may correspond to, for example, a convolution operation according to a stride value.

Next, while maintaining the set of weights, another portion of the first batch channel and another portion of the second batch channel are stored in at least one memory (S2015), and then each of another portion of the first batch channel and another portion of the second batch channel are calculated with the set of weights (S2017).

Next, another set of weights is stored in at least one memory, and an artificial neural network operation is performed using another set of weights (S2019). Here, another set of weights may be referred to as another weight value among weight matrices including at least one weight value.

Specifically, referring to FIG. 8, it is assumed that the memory has three memory spaces in this example.

In this example, it is assumed that a set of weights is at least one of a first weight W1, a second weight W2, a third weight W3, and a fourth weight W4, and another set of weights is another one of the first weight W1, the second weight W2, the third weight W3, and the fourth weight W4.

In this example, it is assumed that the first batch channel Batch A includes A1, A2, A3, and A4, and the second batch channel Batch B includes B1, B2, B3, and B4. Another set of weights may be referred to as the next set of weights (i.e., a subsequent set of weights).

Referring to FIG. 8, the three memory spaces in S1 may be filled with a first weight W1 as a set of weights, a first portion A1 of the first batch channel, and a first portion B1 of the second batch channel. The processing element PE calculates the first weight W1 with each of the first portions A1 and B1 of the first and second batch channels.

In S2, while the first weight W1 is maintained as in S1, the second portion A2 of the first batch channel and the second portion B2 of the second batch channel are filled. The processing element PE calculates the first weight W1 with each of the two portions A2 and B2 of the first and second batch channels.

This first weight W1 may be further maintained during S3 to S4 when calculations for each of the third portions A3 and B3 and the fourth portions A4 and B4 of the first and second batch channels are performed as necessary.

When the calculation of the first weight W1 with each of the first and second batch channels is completed, in S5, the three memory spaces are filled with another set of weights such as the second weight W2, the first portion A1 of the first batch channel, and the first portion B1 of the second batch channel. The processing element PE calculates the second weight W2 and each of the first portions of the first and second batch channels.

This second weight W2 may be maintained during S6 to S8 in which calculations are performed for each of the second portions A2 and B2, the third portions A3 and B3, and the fourth portions A4 and B4 of the first and second batch channels.

When the calculation of the second weight W2 with each of the first and second batch channels is completed, in S9, the three memory spaces are filled with another set of weights such as the third weight W3, the first portion A1 of the first batch channel, and the first portion B1 of the second batch channel. The processing element PE calculates the third weight W3 and each of the first portions of the first and second batch channels.

This third weight W3 may be maintained during S10 to S12 in which calculations are performed for each of the first portions A1 and B1, the second portions A2 and B2, the third portions A3 and B3, and the fourth portions A4 and B4 of the first and second batch channels.

When the calculation of the third weight W3 with each of the first and second batch channels is completed, in S13, the three memory spaces are filled with another set of weights such as the fourth weight W4, the first portion A1 of the first batch channel, and the first portion B1 of the second batch channel. The processing element PE calculates the fourth weight W4 and each of the first portions of the first and second batch channels.

This fourth weight W4 may be maintained during S14 to S16 in which calculations are performed for each of the first portions A1 and B1, the second portions A2 and B2, the third portions A3 and B3, and the fourth portions A4 and B4 of the first and second batch channels.

When the calculation of the first and second batch channels is completed, a feature map is generated, and an activation map may be applied to generate an activation map. The generated activation map may be input to a convolution layer for another convolution operation, input to a pooling layer for a pooling operation, or input to a fully connected layer for classification, but the present disclosure is not limited thereto. These calculations can be performed by the processing element PE.

As such, the processing element PE may calculate a plurality of weight values which is maintained in the memory with each of a plurality of batch channels. That is, it is possible to reuse at least one kernel or a set of weight values corresponding to a plurality of feature maps of the plurality of batch channels, respectively, by maintaining the at least one kernel or the set of weight values until completing calculation of the corresponding feature maps of the plurality of batch channels.

The batch mode of the operation method proposed in FIGS. 7 and 8 may be described as a method of tiling a weight and a feature map for each layer of each batch channel, and may be referred to as a second batch mode. The second batch mode can be utilized when the parameter size of the weight and the parameter size of the feature map of the layers of the artificial neural network model are relatively larger than those of the memory capacity.

Meanwhile, in a related art, when processing a plurality of consecutive data or continuous image data, a plurality of weight values stored in the main memory are newly requested for each operation. Such conventional methodology is inefficient.

On the other hand, the neural processing unit according to the present disclosure continuously maintains the plurality of weight values in the memory, so a total frequency of new accesses of the plurality of weight values can be minimized, thereby improving processing speed and reducing energy consumption. In this example, the memory has the same performance improvement and energy reduction effect in the case of on-chip memory as well as the NPU internal memory.

Figure 9:
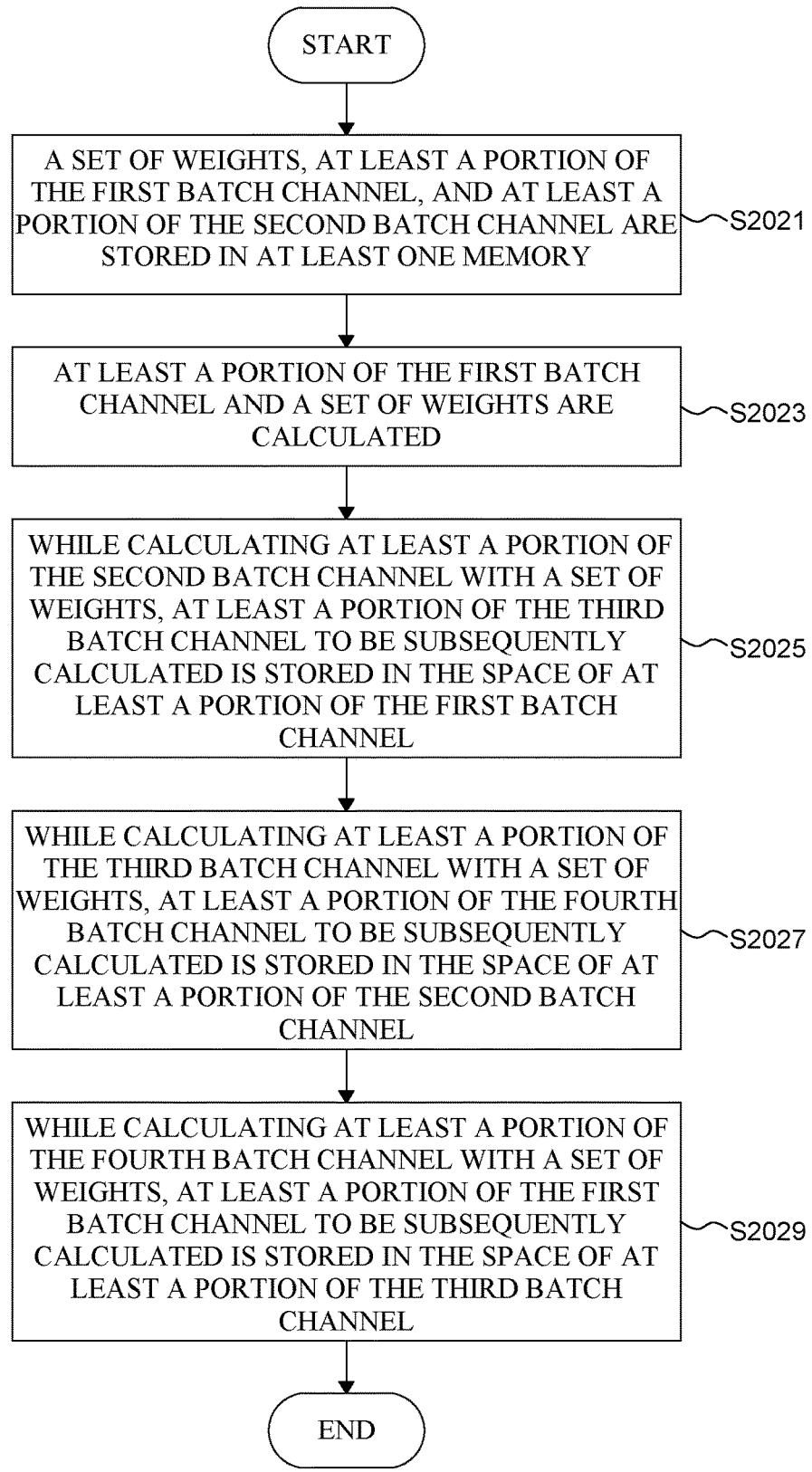
FIG. 9 is an exemplary flowchart illustrating how a neural processing unit operates according to another example of the present disclosure.
Figure 10:
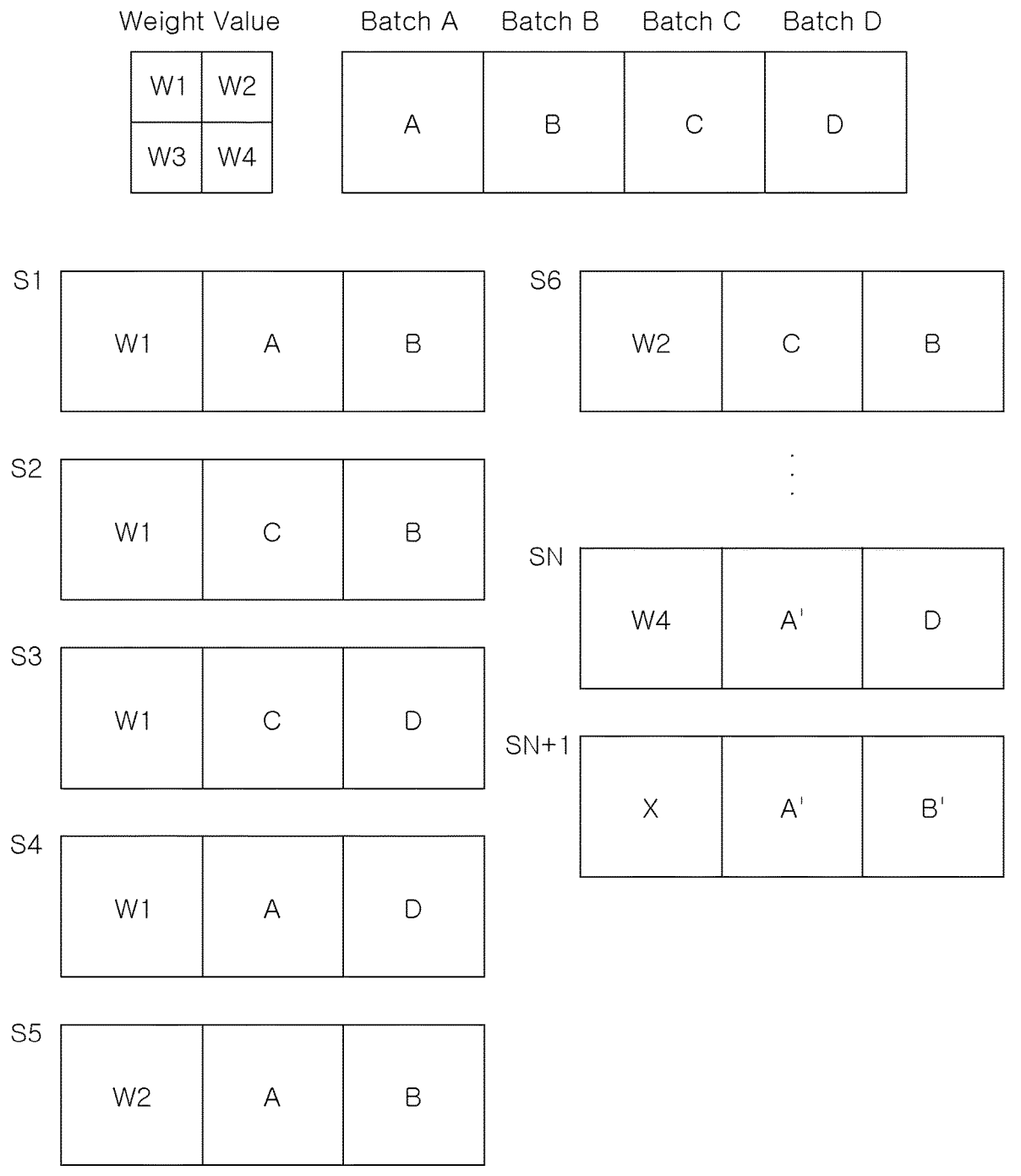

FIG. 9 illustrates how a neural processing unit operates according to another example of the present disclosure. FIG. 10 illustrates a memory space to which artificial neural network parameters are allocated in a neural processing unit according to steps of FIG. 9.

In the presented example, the plurality of batch channels may include a first batch channel Batch A, a second batch channel Batch B, a third batch channel Batch C, and a fourth batch channel Batch D. A set of weights may be divided into four portions (or a part of four portions), for example.

First, referring to FIG. 9, a set of weights, at least a portion of the first batch channel, and at least a portion of the second batch channel are stored in at least one memory (S2021), and at least a portion of the first batch channel and a set of weights are calculated (S2023). Here, one set of weights may mean at least one weight value among weight matrices including at least one weight value. The memory may also be an internal memory, an on-chip memory, or a main memory.

Next, while calculating at least a portion of the second batch channel with a set of weights, at least a portion of the third batch channel to be subsequently calculated is stored in the space of at least a portion of the first batch channel (S2025). That is, the next calculated parameter is loaded into the memory simultaneously with the calculation.

Next, while calculating at least a portion of the third batch channel with a set of weights, at least a portion of the fourth batch channel to be subsequently calculated is stored in the space of at least a portion of the second batch channel (S2027), and while calculating at least a portion of the fourth batch channel with a set of weights, at least a portion of the first batch channel to be subsequently calculated is stored in the space of at least a portion of the third batch channel (S2029).

Specifically, referring to FIG. 10, it is assumed that the memory has three memory spaces in this example. Also, in this example, it is assumed that a set of weights is at least one of a first weight W1, a second weight W2, a third weight W3, and a fourth weight W4.

Referring to FIG. 10, in S1, three memory spaces are filled with a first weight W1 which is a set of weights, a first batch channel A, and a second batch channel B. The processing element PE calculates the first weight W1 with the first batch channel A. In S2, while the processing element PE performs calculations for the first weight W1 and the second batch channel B, the third batch channel C is loaded into a space corresponding to the memory address of the first batch channel A. In this way, since the calculation of the batch channel and the loading operation of the subsequent parameters to be calculated are performed simultaneously. Accordingly, the calculation speed of the neural processing unit can be further increased.

Next, in S3, while the processing element PE performs calculations for the first weight W1 with the third batch channel C, the fourth batch channel D is loaded into a space corresponding to the memory address of the second batch channel B. In S4, while the processing element PE performs calculations for the first weight W1 with the fourth batch channel D, the first batch channel A is loaded into a space corresponding to the memory address of the third batch channel C.

When the calculation of the first weight W1 with each batch channel is completed, in S5, the second weight W2 is loaded into the space corresponding to the memory address of the first weight W1. In S5, while the processing element PE performs calculations for a set of weights which is the second weight W2 and the first batch channel A, the second batch channel B is loaded into a space corresponding to the memory address of the fourth batch channel D. In various examples, the second weight W2 may be loaded into a space corresponding to another memory address while the first weight W1 is calculated.

When the calculation for the second weight W2 with each batch channel is completed, the calculation for the third weight W3, which is a set of weights, and each batch channel may be performed. Such calculation can be performed in a similar manner to the calculation as described above.

When the calculation for the third weight W3 and each batch channel is completed, the calculation for the fourth weight W4, which is a set of weights, and each batch channel may be performed, and such calculation may also be performed similarly to the above calculation. For example, in SN, while the processing element PE performs the calculation between the fourth weight W4 and the fourth batch channel D, a calculated value (i.e., an operation value) A' of the first weight W1 and the first batch channel A is loaded into a space corresponding to the memory address of the third batch channel C.

When the calculation for the fourth weight W4 and each batch channel is completed, in SN+1, the parameter X is loaded for subsequent processing in the space corresponding to the memory address of the fourth weight W4. In SN+1, while the processing element PE performs the calculation for the parameter X and the calculated value A', the calculated value B' of the first weight W1 and the second batch channel B is loaded into a space corresponding to the memory address of the fourth batch channel D.

When the calculation of the first, second, third, and fourth batch channels is completed, a feature map is generated, and an activation map may be applied to generate an activation map. The activation map generated as described above may be input to a convolution layer for another convolution operation, input to a pooling layer for a pooling operation, or input to a fully connected layer for classification, but the present disclosure is not limited thereto. These calculations can be performed by the processing element PE as described above.

As such, the processing element PE may calculate a plurality of weights which is maintained in the memory and each of a plurality of batch channels.

In more detail, like the step of transitioning from S1 to S2, at least a portion of the first batch channel A may be overwritten by the third batch channel C. That is, during a specific time, the memory space in which the first batch channel A is stored may be gradually filled by the third batch channel C. In this case, the memory space overwritten by the third batch channel C may be a memory space in which data of the first batch channel A, which has been convolved using the W1 weight, is stored.

That is, in case of a memory space where the calculated input feature map is stored, another batch channel may be gradually filled the memory space where a specific batch channel is stored.

The batch mode of the operation method proposed in FIGS. 9 and 10 may be referred to as a method in which parameters of at least some channels (for example, two channels) of the plurality of batch channels (for example, four channels) are stored in a memory, respectively, and then when calculating the parameters of another batch channel, parameters of another batch channel to be calculated next are loaded into the memory area of the one batch channel where the parameter calculation is completed. This method may be referred to as a third batch mode. In the third batch mode, the size of each area allocated to the memory can be increased because the memory area is not divided as many as the total number of batch channels, but the memory area is divided into fewer than the total number of batch channels.

Meanwhile, in a related art, when processing a plurality of consecutive data or continuous image data, a weight is newly accessed for each operation. Such conventional methodology is inefficient.

On the other hand, the neural processing unit according to the present disclosure maximizes the memory space utilization by loading a new batch channel or a new weight into a space corresponding to a memory address that has been used while weights and batch channels are calculated, thereby, the processing speed can be improved and the energy consumption can be reduced. In this example, the memory has the same performance improvement and energy saving effect in the case of on-chip memory as well as the NPU internal memory.

Figure 11:
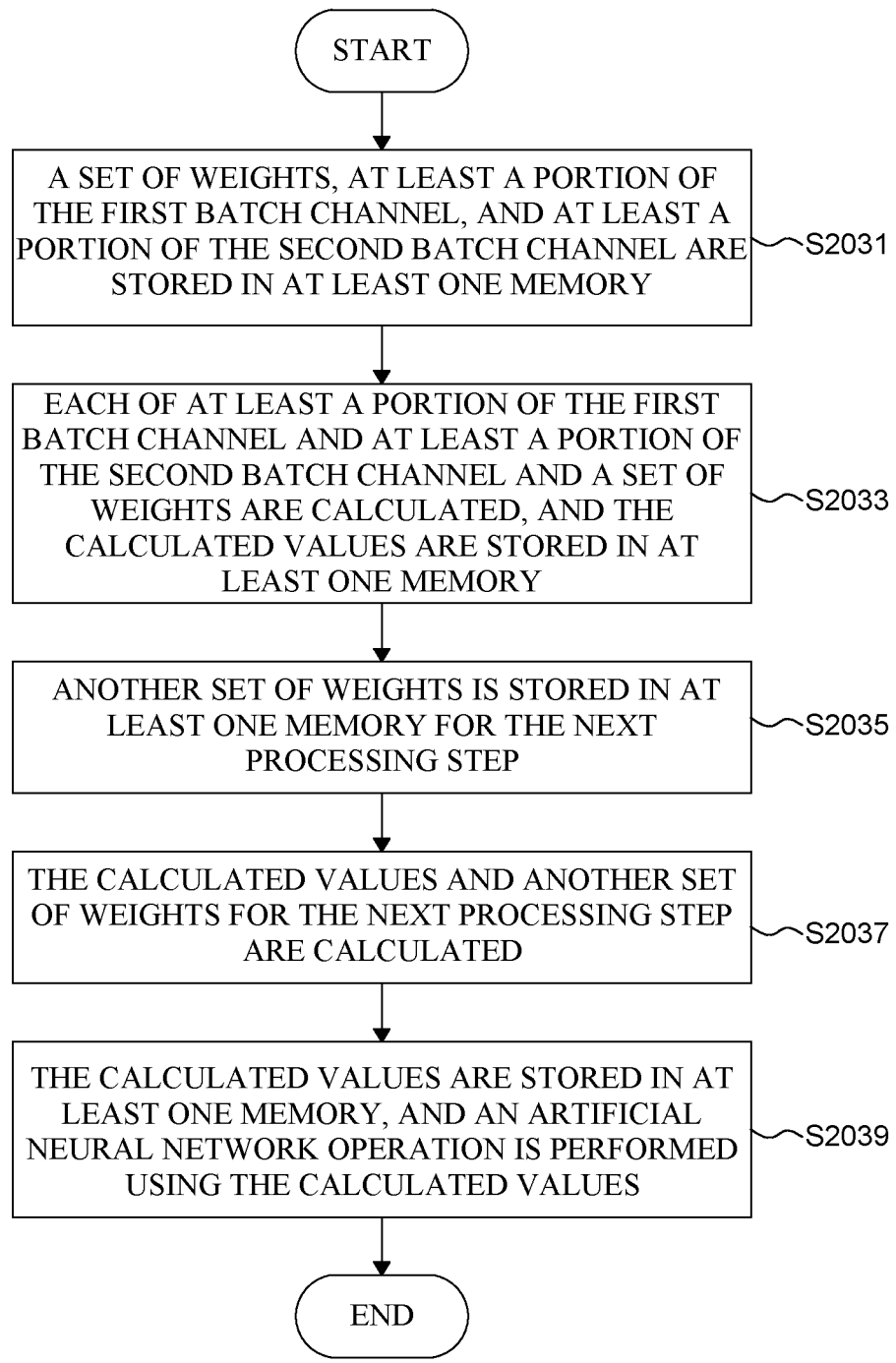
FIG. 11 is an exemplary flowchart illustrating how a neural processing unit operates in accordance with various examples of the present disclosure.
Figure 12:
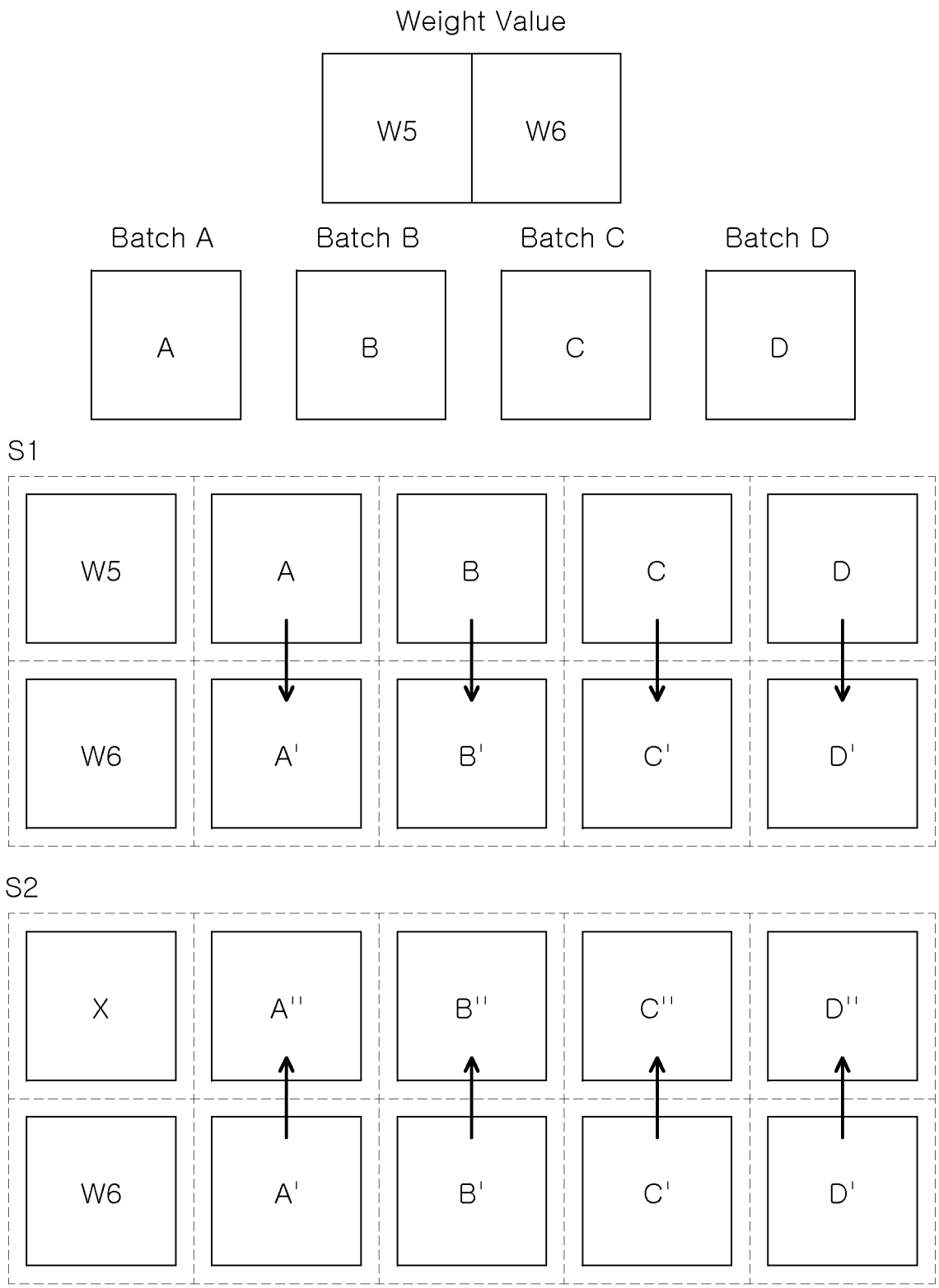
FIG. 12 is an exemplary schematic diagram illustrating allocation of artificial neural network parameters in a memory space in an NPU according to the examples of FIG. 11.

FIG. 11 illustrates how a neural processing unit operates in accordance with various examples of the present disclosure. FIG. 12 illustrates a memory space to which artificial neural network parameters are allocated in a neural processing unit according to steps of FIG. 11.

In the presented example, the plurality of batch channels may include a first batch channel Batch A, a second batch channel Batch B, a third batch channel Batch C, and a fourth batch channel Batch D. A set of weights may be divided into two portions, for example.

First, referring to FIG. 11, a set of weights, at least a portion of the first batch channel, and at least a portion of the second batch channel are stored in at least one memory (S2031), and each of at least a portion of the first batch channel and at least a portion of the second batch channel and a set of weights are calculated, and the calculated values are stored in at least one memory (S2033). Here, a set of weights means a weight matrix including at least one weight value, and the memory may be an internal memory, an on-chip memory, or a main memory. In this example, the calculated value may be stored in the same memory as a set of weights, at least a portion of the first batch channel, and at least a portion of the second batch channel.

Next, another set of weights is stored in at least one memory for the next processing step S2035, and the calculated values and another set of weights for the next processing step are calculated (S2037). The calculation may correspond to a ReLU operation or a next stage convolution operation, but the present disclosure is not limited thereto. The calculated values are stored in at least one memory, and an artificial neural network operation is performed using the calculated values (S2039).

Since the calculated values are maintained in the NPU internal memory 200, there is no need to access a main memory or an external memory for calculation.

Specifically, referring to FIG. 12, in this example, it is assumed that the memory may have ten memory spaces. Also, in this example, it is assumed that one set of weights means a first weight W5, and another set of weights means a second weight W6.

Referring to FIG. 12, in S1, in the five memory spaces, a set of weights of a first weight W5, a first batch channel A, a second batch channel B, a third batch channel C, and a fourth batch channel D are filled. The processing element PE calculates the first weight W5 with each of the first, second, third, and fourth batch channels. The calculated values A', B', C', and D' are stored in four memory spaces, and another set of weights, the second weight W6, is loaded into one memory space for the next processing step.

Next, in S2, while the second weight W6 is maintained as in S1, the second weight W6 and the calculated values A', B', C', and D' are respectively calculated. This calculation is performed by the processing element PE and may correspond to, for example, a ReLU operation or a next stage convolution operation.

The used first weight W5 may be deleted from the memory. A second calculated values A", B", C", and D" which are the calculated values of a first calculated values A', B', C', and D' with the second weight W6 are filled in the memory space of each of the first batch channel A, the second batch channel B, the third batch channel C, and the fourth batch channel D. The next parameter, for example, a parameter X is loaded into a memory space.

In various examples, an operation, in which the calculated values are stored in at least one memory and an operation, in which another set of weights or parameters for the next processing step are calculated, may be performed using data only stored in the internal memory.

In this way, the calculated values may be continuously maintained in the memory.

The batch mode of the operation method proposed in FIGS. 11 and 12 can be described as a method of processing each batch channel by utilizing the characteristic that the output feature map is used as the input feature map of the next operation, and may be referred to as the fourth batch mode.

On the other hand, in a related art, when a plurality of consecutive data or continuous image data is processed, a calculation value for the image data is stored in the main memory, and is newly accessed for subsequent calculation each time the operation is performed. This conventional approach is inefficient.

On the other hand, the neural processing unit according to the present disclosure continuously maintains the calculated values in the NPU internal memory 200, so that new accesses of the calculated values can be minimized, thereby improving the processing speed and reducing the energy consumption. In this example, the memory has been described as the NPU internal memory 200, but the present disclosure is not limited thereto, and has a higher performance improvement and energy saving effect in the case of an on-chip memory.

The artificial neural network model includes a plurality of layers, and each layer includes weight parameters and feature map parameter information. The NPU scheduler may be provided with the parameter information.

According to the present disclosure, the neural processing unit may be configured to process the artificial neural network model by selectively utilizing at least one of the aforementioned first to fourth batch modes.

The neural processing unit may apply a specific batch mode to a specific group of layers of the artificial neural network model.

The neural processing unit may process a portion of one layer of the artificial neural network model in a specific batch mode and process another portion in another batch mode.

The neural processing unit may apply a specific batch mode to each layer of the artificial neural network model.

The neural processing unit may apply a plurality of batch modes to one layer of the artificial neural network model.

The neural processing unit may be configured to provide an optimal batch mode for each layer of the artificial neural network model.

Figure 13:
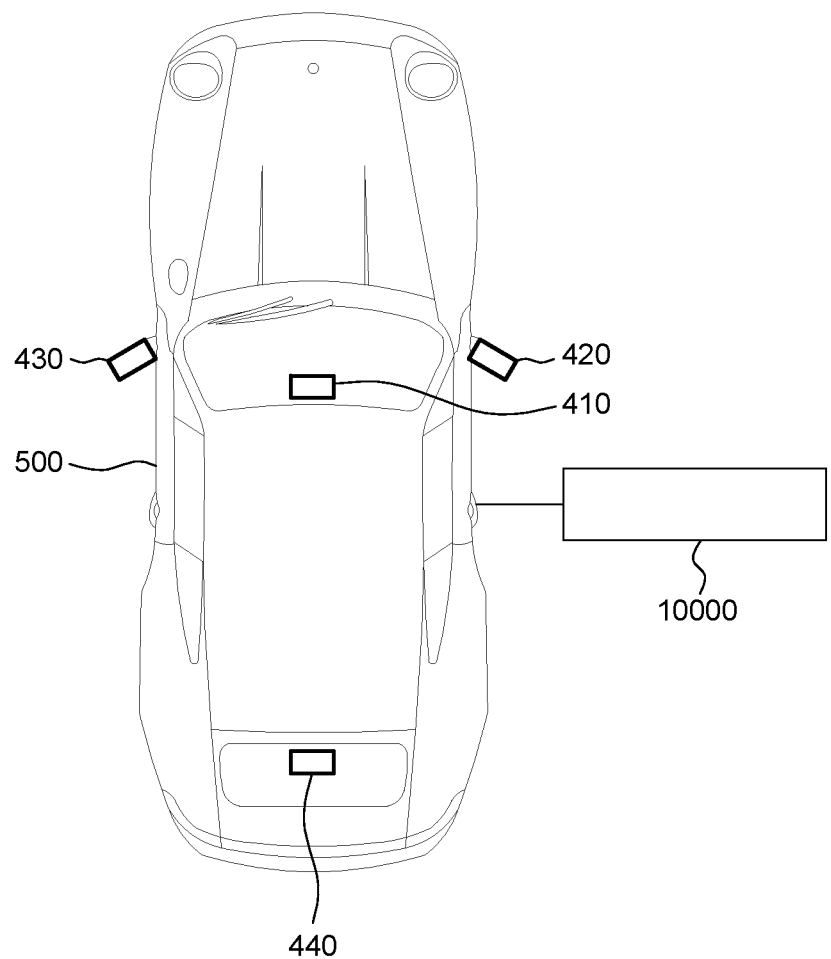
FIG. 13 is an exemplary diagram illustrating an autonomous driving system in which a neural processing unit is mounted according to an exemplary embodiment of the present disclosure.

FIG. 13 illustrates an autonomous driving system in which a neural processing unit is mounted according to an exemplary embodiment of the present disclosure.

Referring to FIG. 13, the autonomous driving system C may include an autonomous driving vehicle having a plurality of sensors for autonomous driving and a vehicle controller 10000 that controls the vehicle so that the vehicle performs autonomous driving based on sensing data obtained from the plurality of sensors.

The autonomous driving vehicle may include a plurality of sensors, and may perform autonomous driving by monitoring the surroundings of the vehicle through the plurality of sensors.

The plurality of sensors provided in the autonomous driving vehicle may include various sensors that may be required for autonomous driving. For example, various sensors may include an image sensor, a radar, and/or a lidar, and/or an ultrasonic sensor, and the like. In addition, the plurality of sensors may include a plurality of the same sensor or a plurality of different sensors.

The image sensor may correspond to the front camera 410, the left camera 430, the right camera 420, and the rear camera 440. In various examples, the image sensor may correspond to a 360 degree camera or a surround view camera.

The image sensor may include, but is not limited to, an image sensor for capturing a color image (for example, an RGB (380 nm to 680 nm) image), such as a complementary metal oxide semiconductor (CMOS) sensor or a charge coupled device (CCD) sensor.

In various examples, the image sensor may further include an infrared (IR) sensor and/or a near-IR (NIR) sensor for photographing a night vision as well as a daytime environment of the autonomous vehicle, but is not limited thereto. These sensors may be used to compensate for the quality of a low-light image at night captured in a night environment by a color image sensor. Here, the NIR sensor may be implemented in the form of a quad pixel combining the structures of the RGB and IR sensors of the CMOS sensor, but is not limited thereto.

In order to take a near-infrared image using the NIR sensor, the autonomous vehicle may further include a NIR light-emitting source (for example, 850 nm to 940 nm). This NIR light-emitting source is not observed by the human eye and does not interfere with the view of other drivers, and may be provided as an additional light source to the vehicle headlights.

In various examples, the IR sensor is a thermal sensor and may be used to take a thermal image. In various examples, the autonomous vehicle may further include an IR light source corresponding to the IR sensor.

For example, the thermal image may be configured to include an RGB image and thermal sensing information synchronized thereto. In addition, the thermal image may be used to recognize a road surface temperature, an engine of a vehicle, an exhaust vent, wild animals in a night environment, and/or an icy road, which may be risk factors during autonomous driving.

In various examples, the IR sensor may be used for determining a status of the driver's high fever, cold, coronavirus infection, and/or indoor air conditioning by detecting the temperature of the driver (or user) through thermal sensing when provided in the interior of the autonomous vehicle.

The captured thermal image may be used as a reference image for training of an artificial neural network model, which will be described later for object detection.

In various examples, the IR light source may be synchronized with a plurality of IR image sensors, and the thermal image captured by the synchronized IR light source and the plurality of IR image sensors may be used as a reference image for training an artificial neural network model to be described later for object detection.

In various examples, the IR light source may have an irradiation angle at frontside, and the irradiation angle may be different from that of the vehicle's irradiation angle of the headlight.

In various examples, the NIR light source and/or the IR light source are turned on/off for each frame of the image sensor, respectively, and may be used to recognize objects having retro-reflector characteristics (for example, safety belts, traffic signs, and a retro-reflector of a vehicle, and the like).

As described above, a plurality of cameras including an image sensor may be provided in various numbers at various locations of the autonomous vehicle. Here, various positions and various numbers may be positions and numbers required for autonomous driving.

The plurality of cameras 410, 420, 430, and 440 may capture an image around the vehicle such as surroundings thereof and transmit the plurality of captured images to the vehicle controller. The plurality of images may include at least one of an infrared image and a near-infrared image (or thermal image) along with a color image (for example, an RGB image) taken at the same time, or an image formed by combinations thereof, but the present disclosure is not limited thereto.

In various examples, the plurality of cameras 410, 420, 430, and 440 may be provided in the interior of the autonomous vehicle. As described above, the plurality of cameras provided in the interior may be arranged in various positions, and images captured through them may be used for a driver state monitoring system, but the present disclosure is not limited thereto. In various examples, the captured image may be used to determine the driver's drowsiness, intoxication, neglect of infants, convenience, safety, and the like.

The autonomous vehicle may receive a vehicle driving instruction from the vehicle controller 10000 and may drive the vehicle according to the received vehicle driving instruction.

Next, the vehicle controller 10000 may be an electronic device for controlling an autonomous vehicle based on sensing data obtained from a plurality of sensors. The vehicle controller 10000 may be implemented such as an electric system that can be mounted on a vehicle, a dash-camera that can be attached to a vehicle, or a portable device such as a smartphone, a personal digital assistant (PDA), and/or a tablet PC (Personal Computer), but the present disclosure is not limited thereto.

The vehicle controller 10000 may include a processor. The processor may be configured to include at least one of a central processing unit (CPU), a graphics processing unit (GPU), an application processor (AP), a digital signal processing unit (DSP), an arithmetic logic unit (ALU), and a neural processing unit (NPU). However, the processor of the present disclosure is not limited to the above-described processors.

Specifically, the vehicle controller 10000 may generate autonomous driving map data used for autonomous driving by using sensing data obtained from a plurality of sensors, and autonomous driving instructions based on the generated autonomous driving map data can be transmitted to autonomous vehicles.

Here, the autonomous driving map data is map data that accurately or precisely represents the surrounding environment of a vehicle detected based on sensing data measured by at least one sensor such as a camera, radar, lidar, and/or ultrasonic sensor, and may be implemented in a three-dimensional space.

In order to generate such autonomous driving map data, the vehicle controller 10000 may detect road environment data and real-time environment data based on the sensing data. The road environment data may include, but is not limited to, lanes, guardrails, road curvature/slope, traffic light/sign location, and/or traffic signs. Real-time environmental data may be environment data that changes every moment, and may include, but is not limited to, approaching vehicles at front and rear, construction (or accident) areas, road traffic, real-time signal information, road surface conditions, obstacles, and/or pedestrians. In various examples, road environment data and real-time environment data may be continuously updated.

The autonomous driving map data may be generated using the sensing data as described above, but is not limited thereto, and map data previously generated for a specific region may be used.

The pre-generated map data may include at least some of road environment data and surrounding environment data previously collected by a survey vehicle equipped with various sensors, and may be stored in a cloud-based database. Such map data may be analyzed in real time and continuously updated.

The vehicle controller 10000 may obtain map data of a region corresponding to the location of the autonomous vehicle from a database, and may generate autonomous driving map data based on sensing data measured by various sensors together with the acquired map data. For example, the vehicle controller 10000 may generate autonomous driving map data by updating map data acquired in relation to a specific region in real time based on the sensing data.

The vehicle controller 10000 may need to accurately recognize a rapidly changing surrounding environment in real time in order to control autonomous driving of the vehicle. In other words, it is necessary to accurately and continuously recognize a target object (or object) that can be considered around the vehicle in order to cope with a dangerous situation in advance when the vehicle autonomously drives. Here, the target object may include at least one of front and rear approaching vehicles, traffic lights, real-time signal information of traffic lights, obstacles, humans, animals, roads, signs, road lines, and pedestrians, but is not limited thereto.

If accurate and continuous recognition of the target object is not achieved in the surrounding environment of the vehicle, dangerous situations such as a serious accident between the vehicle and the target object may occur, which may disable safe and correct autonomous driving of the vehicle.

For safe autonomous driving of the vehicle, the vehicle controller 10000 may recognize a target object related to autonomous driving based on a plurality of images received from the plurality of cameras 410, 420, 430, and 440. Here, the plurality of images may be images captured at the same time by the plurality of cameras 410, 420, 430, and 440. As described above, such cameras may be processed by a NPU having a plurality of batch channels and a memory corresponding to the batch channels.

For accurate and continuous recognition of the target object, an AI-based object detection model (or an artificial neural network model, i.e., ANN) trained to recognize the target object based on training data about various surrounding environments of the vehicle may be used. Here, the training data may be a plurality of reference images of various surrounding environments of the vehicle, but is not limited thereto. Here, the plurality of reference images may include at least two or more of infrared, near-infrared, and thermal images along with a color image, but is not limited thereto. In various examples, the plurality of reference images may be formed by a combination of at least two or more of image sensor (for example, a color image sensor, an IR sensor, and/or an NIR sensor), a lidar, a radar, and an ultrasonic sensor.

The vehicle controller 10000 recognizes a target object from the images received from the plurality of cameras 410, 420, 430, 440 using the object detection model, and may transmit an autonomous driving instruction based on the recognized target object to the autonomous driving vehicle. For example, when a target object such as a pedestrian is recognized on a road during autonomous driving, the vehicle controller 10000 may transmit an instruction for stopping the driving of the autonomous driving vehicle to the autonomous driving vehicle.

As described above, the present disclosure may recognize a target object that can be considered for autonomous driving of an autonomous vehicle using an AI-based object detection model, thereby enabling accurate and fast object detection.

Hereinafter, an autonomous driving vehicle will be described in more detail with reference to FIG. 14.

Figure 14:
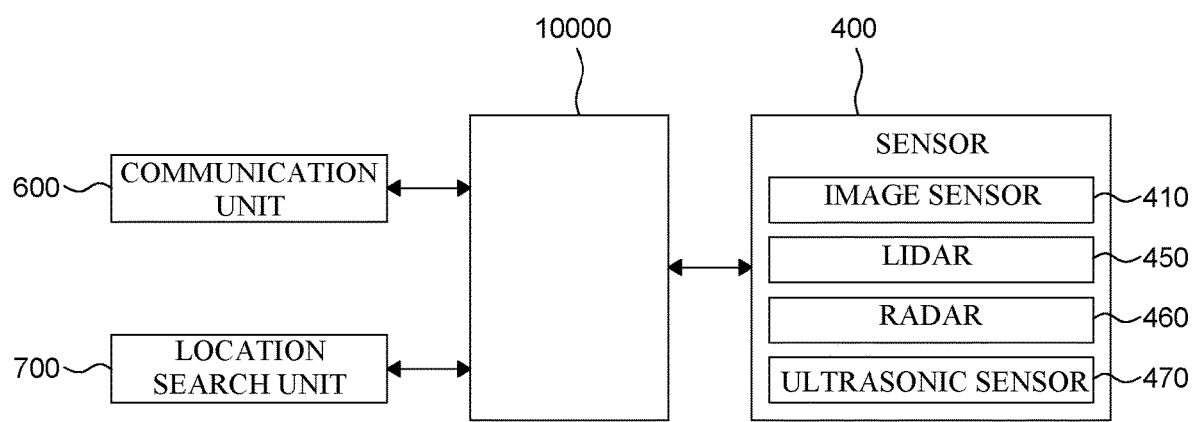
FIG. 14 is a schematic block diagram of an autonomous driving system in which a neural processing unit is mounted according to an example of the present disclosure.

FIG. 14 illustrates an autonomous driving system in which a neural processing unit is mounted according to an example of the present disclosure.

Referring to FIG. 14, the autonomous vehicle may include a communication unit 600, a sensor 400, a storage unit, and a controller. In the presented example, the autonomous vehicle may refer to the autonomous driving system of FIG. 13.

The communication unit 600 connects the autonomous vehicle to enable communication with an external device. The communication unit 600 may be connected to the vehicle controller 10000 using wired/wireless communication to transmit/receive various data related to autonomous driving. In detail, the communication unit 600 may transmit sensing data obtained from a plurality of sensors to the vehicle controller 10000, and may receive an autonomous driving instruction from the vehicle controller 10000.

The location search unit 700 may search for a location of the autonomous vehicle. The location search unit 700 may use at least one of satellite navigation and dead reckoning. For example, when using satellite navigation, the location search unit 700 may obtain location information from a location search system such as a global positioning system (GPS), a global navigation satellite system (GLONASS), Galileo, Beidou, and the like that measures vehicle location information.

When dead reckoning is used in various examples, the location search unit 700 may calculate the course and speed of the vehicle from motion sensors such as a speedometer, a gyro sensor, and a geomagnetic sensor of the vehicle, and estimate location information of the vehicle based on this.

In various examples, the location search unit 700 may obtain location information of the vehicle using both satellite navigation and dead reckoning.

The sensor 400 may acquire sensing data used to sense the surrounding environment of the vehicle. The sensor 400 may include an image sensor 410, a lidar 450, a radar 460, and an ultrasonic sensor 470. A plurality of the same sensors may be provided, or a plurality of different sensors may be provided.

The image sensor 410 is provided to capture the surroundings of the vehicle, and may be at least one of a CCD sensor, a CMOS sensor, an IR sensor, and/or an NIR sensor. A plurality of such image sensors 410 may be provided, and a plurality of cameras may be provided at various locations in the autonomous vehicle to correspond to the plurality of image sensors. For example, a plurality of front, left/right, and rear cameras may be provided to capture the surroundings of the vehicle, or a 360-degree camera or a surround view camera may be provided, but is not limited thereto.

In various examples, a camera corresponding to a CCD sensor and/or a CMOS sensor may acquire a color image about a vehicle's surroundings.

In various examples, the IR sensor and/or the NIR sensor may detect an object by sensing a temperature or the like based on infrared and/or near-infrared rays. Corresponding to the IR sensor and/or the NIR sensor, an infrared camera, a near-infrared camera and/or a thermal imaging camera are provided at at least one location of the autonomous vehicle, thereby an infrared image, a near-infrared image, and/or a thermal image of the vehicle's surroundings may be acquired. The infrared image, the near-infrared image, and/or the thermal image obtained in this way may be used for autonomous driving in a place where light is low in an otherwise dark area.

The radar 460 may detect the position of the object, the speed of the object, and/or the direction of the object by emitting an electromagnetic wave and using an echo wave that is reflected and returned from a surrounding object. In other words, the lidar 450 may be a sensor for detecting an object in the environment in which the vehicle is located.

The lidar 450 may be a sensor capable of sensing a surrounding environment, such as a shape of an object and/or a distance from an object, by emitting a laser and using reflected light that is reflected and returned from a surrounding object.

The ultrasonic sensor 470 may detect a distance between the vehicle and the object by emitting an ultrasonic wave and using the ultrasonic wave reflected from the surrounding object. The ultrasonic sensor 470 may be used to measure a short distance between a vehicle and an object. For example, the ultrasonic sensor 470 may be provided on the front left, front right, left side, rear left, rear right, and right side of the vehicle, but is not limited thereto.

The storage unit may store various data used for autonomous driving. In various examples, the storage unit may include at least one type of storage unit such as flash memory type, hard disk type, multimedia card micro type, card type memory (such as SD or XD memory), random access memory (RAM), static random-access memory (SRAM), read-only memory (ROM), electrically erasable programmable read-only memory (EEPROM), programmable read-only memory (PROM), magnetic memory, magnetic disk, optical disk and the like.

The controller is operatively connected to the communication unit 600, the location search unit 700, the sensor 400, and the storage unit, and may perform various commands for autonomous driving. The controller may be configured to include one of a central processing unit (CPU), a graphics processing unit (GPU), an application processor (AP), a digital signal processing unit (DSP), and an arithmetic logic unit (ALU) in addition to a neural processing unit (NPU).

Specifically, the controller transmits the sensing data acquired through the sensor to the vehicle controller 10000 through the communication unit 600. Here, the sensing data may be used to generate autonomous driving map data or to recognize a target object. For example, sensing data may include at least one of, but is not limited to, image data acquired by the image sensor 410, position data of the object obtained by the lidar 450, data representing the object's velocity and/or the direction of the object and the like, data indicating the shape of the object and/or the distance to the object obtained by the radar 460, data indicating the distance between the vehicle and the object acquired by the ultrasonic sensor 470, and the like. Here, the image data may include a plurality of images among a color image, an infrared image, a near-infrared image, and a thermal image captured at the same time. In various examples, the image data may be formed by a fusion of at least two or more of the image sensor 410, the lidar 450, the radar 460, and the ultrasonic sensor 470.

The controller may receive an autonomous driving instruction from the vehicle controller 10000 and perform autonomous driving of the vehicle according to the received autonomous driving instruction.

Figure 15:
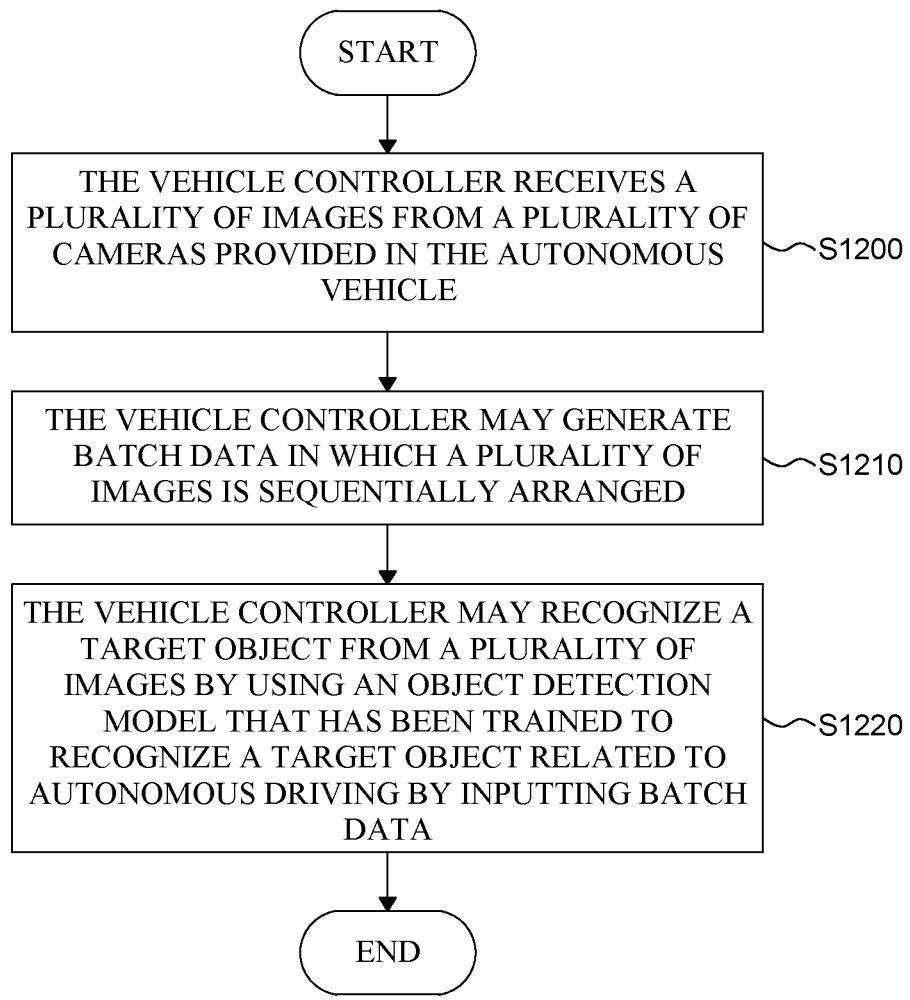
FIG. 15 is a flowchart for recognizing a target object for autonomous driving in an autonomous driving system equipped with a neural processing unit according to an example of the present disclosure.

FIG. 15 illustrates a process of recognizing a target object for autonomous driving in an autonomous driving system equipped with a neural processing unit according to an example of the present disclosure.

Referring to FIG. 15, the vehicle controller receives a plurality of images from a plurality of cameras provided in the autonomous vehicle (S1200). Here, the plurality of images are images captured at the same time, and may include a color image, an infrared image, and/or a thermal image. In other words, a plurality of images or a video may mean images captured during substantially the same period. As such, when a color image and an infrared image, or a color image and a thermal image are used, autonomous driving at night as well as daytime autonomous driving of the vehicle may be efficiently performed. In other words, the plurality of images may include at least one of an RGB image, an IR image, a radar image, an ultrasound image, a lidar image, a thermal image, and a NIR image.

The vehicle controller may generate batch data in which a plurality of images is sequentially arranged (S1210). Here, the batch data may correspond to an input node configuring the input layer of the object detection model, and may mean a plurality of batch channels. Each of the plurality of batch channels may correspond to each of the plurality of images. The vehicle controller may recognize a target object from a plurality of images by using an object detection model that has been trained to recognize a target object related to autonomous driving by inputting batch data (S1220). Here, the object detection model refers to an artificial neural network model trained to recognize a target object from a plurality of training images by inputting a plurality of training images related to various surrounding environments of the vehicle. Various surrounding environments of the vehicle may include day and/or night environments, and in order to accurately recognize a target object in these environments, an image obtained by capturing a day environment and/or an image obtained by capturing a night environment may be used as a training image.

In this example, the ANN (i.e., artificial neural network model) may perform at least one operation including object detection, classification, or segmentation from a plurality of batch channels. Such an ANN may pre-process a plurality of batch channels for improved detection of an object, and may be configured to simultaneously detect an object from a plurality of batch channels while pre-processing the plurality of batch channels. Here, the plurality of batch channels may correspond to channels of any one of RGB, YCBCR, HSV, or HIS color spaces and IR channels. In addition, each of the plurality of batch channels may include an image capturing the interior of the vehicle, and the ANN may be configured to detect at least one of an object, a function, a driver's state, and a passenger's state related to vehicle-safety.

In various examples, each of the plurality of batch channels may correspond to each of the plurality of sensor data. The plurality of sensor data may include data from one or more of a pressure sensor, a piezo sensor, a humidity sensor, a dust sensor, a smog sensor, a sonar sensor, a vibration sensor, an acceleration sensor, or a motion sensor. When the target object is recognized in this way, the vehicle control device may transmit an autonomous driving instruction related to the recognized target object to the autonomous driving vehicle so that the autonomous driving vehicle can safely perform autonomous driving.

The examples illustrated in the specification and the drawings are merely provided to facilitate the description of the subject matter of the present disclosure and to provide specific examples to aid the understanding of the present disclosure and it is not intended to limit the scope of the present disclosure. It is apparent to those of ordinary skill in the art to which the present disclosure pertains in which other modifications based on the technical spirit of the present disclosure can be implemented in addition to the examples disclosed herein.

[National R&D Project Supporting this Invention]
[Project Identification Number] 1711116381
[Task Number] 2020-0-00364-001
[Name of Ministry] Ministry of Science and ICT
[Name of Task Management (Specialized) Institution] Institute of Information & Communications Technology Planning & Evaluation
[Research Project Title] Development of Semiconductor Technology Applicable for Artificial Intelligence
[Research Task Name] Development of NPU and Application System for Enhancing Communication Technology for Vehicles based on Artificial Intelligence (AI)
[Contribution rate] 1/1
[Name of the organization performing the task] DeepX Co., Ltd.
[Research Period] 2020.04.01~ 2020.12.31

What is claimed is:

1. A method of performing a plurality of operations on an artificial neural network (ANN), the plurality of operations comprising:
    storing in corresponding memory spaces respectively formed in one memory a weight and at least a portion of each of a plurality of batch channels, the one memory formed by an on-chip memory mounted on a semiconductor die, each batch channel of the plurality of batch channels being equal to a feature map;
    calculating the at least a portion of each of the plurality of batch channels by the stored weight, while simultaneously prefetching in the on-chip memory at least another portion of each of the plurality of batch channels or at least a portion of each of a plurality of next batch channels,
    wherein the prefetching in the on-chip memory is a storing step that occurs prior to performing a calculation with the at least another portion of each of the plurality of batch channels or the at least a portion of each of the plurality of next batch channels,
    wherein each of the plurality of batch channels consists of a plurality of portions,
    wherein the storing and calculating operations are performed sequentially for all portions of the plurality of portions constituting each of the plurality of batch channels, and
    wherein the weight is maintained in a corresponding memory space of the memory spaces formed in the one memory until the calculating operation for all portions of the plurality of portions constituting each of the plurality of batch channels is completed.

2. The method of claim 1,
    wherein the plurality of batch channels includes a first batch channel and a second batch channel, and
    wherein at least a portion of the first batch channel and at least a portion of the second batch channel are equal in size.

3. The method of claim 2, wherein the weight corresponds to each of the at least a portion of the first batch channel and the at least a portion of the second batch channel.

4. The method of claim 2, the plurality of operations further comprising:
    storing in the on-chip memory at least a portion of a third batch channel of the plurality of batch channels and at least a portion of a fourth batch channel of the plurality of batch channels while maintaining the weight; and
    calculating the at least a portion of the third batch channel and the at least a portion of the fourth batch channel by the weight.

5. The method of claim 2, the plurality of operations further comprising:
    storing in the on-chip memory a subsequent set of weights, a subsequent portion of the first batch channel, and a subsequent portion of the second batch channel; and
    calculating the subsequent portion of the first batch channel and the subsequent portion of the second batch channel by the subsequent set of weights.

6. The method of claim 2, the plurality of operations further comprising:
    storing in the on-chip memory the weight and a set of first values calculated from the at least a portion of the first batch channel and the at least a portion of the second batch channel;
    storing in the on-chip memory a subsequent set of weights for a subsequent processing step; and
    performing a calculation with the set of first values and the subsequent set of weights.

7. The method of claim 6, further comprising
    storing in an internal memory the set of first values and a set of second values obtained by calculating the subsequent set of weights.

8. The method of claim 2, wherein the at least a portion of the first batch channel and the at least a portion of the second batch channel include a complete data set.

9. The method of claim 2, the plurality of operations further comprising:
tiling a size of the weight, a size of the at least a portion of the first batch channel, and a size of the at least a portion of the second batch channel to be fit into an internal memory.

10. The method of claim 1, wherein the ANN is configured to perform at least one operation of the plurality of operations, the at least one operation including detection, classification, or segmentation of an object from the plurality of batch channels.

11. The method of claim 10, wherein the object includes at least one of a vehicle, a traffic-light, an obstacle, a pedestrian, a person, an animal, a road, a traffic-sign, and a lane.

12. The method of claim 10, the plurality of operations further comprising:
pre-processing the plurality of batch channels before the at least a portion of the first batch channel and the at least a portion of the second batch channel are stored in the on-chip memory.

13. The method of claim 12, wherein the ANN is configured to simultaneously detect the object from the plurality of batch channels while pre-processing the plurality of batch channels.

14. The method of claim 1, wherein each of the plurality of batch channels corresponds to a plurality of images, respectively.

15. The method of claim 14, wherein the plurality of batch channels includes at least one batch channel having one of infrared (IR), red-green-blue (RGB), luminance-chrominance (YCbCr), hue-saturation-value (HSV), and hue-saturation-intensity (HSI) format.

16. The method of claim 14,
wherein the plurality of batch channels includes at least one batch channel for capturing an image of an interior of a vehicle, and
wherein the ANN is configured to detect at least one of an object, a function, a driver state, and a passenger state related to vehicle-safety.

17. The method of claim 14, wherein the plurality of images includes at least one of a red-green-blue (RGB) image, an infrared (IR) image, a radar image, an ultrasound image, a lidar image, a thermal image, a near-infrared (NIR) image, and a fusion image.

18. The method of claim 14, wherein the plurality of images is captured in the same time period.

19. The method of claim 1,
wherein each of the plurality of batch channels corresponds to a plurality of sensor data, respectively, and
wherein the plurality of sensor data includes data from at least one of a pressure sensor, a piezo sensor, a humidity sensor, a dust sensor, a smog sensor, a sonar sensor, a vibration sensor, an acceleration sensor, and a motion sensor.

20. A neural processing unit for an artificial neural network for processing a plurality of batch channels, each batch channel of the plurality of batch channels being equal to a feature map, the neural processing unit comprising:
corresponding memory spaces respectively formed in one memory configured to store a weight and at least a portion of each of the plurality of batch channels; and
at least one processing element (PE) configured to
apply the stored weight to the at least a portion of the first batch channel and the at least a portion of each of the plurality of batch channels, each of the at least one PE including one or both of a multiply and accumulate operator and an arithmetic logic unit operator,
calculate the at least a portion of each of the plurality of batch channels by the stored weight, while simultaneously prefetching in the one memory at least another portion of each of the plurality of batch channels or at least a portion of each of a plurality of next batch channels,
wherein the prefetching in the one memory is a storing step that occurs prior to performing a calculation with the at least another portion of each of the plurality of batch channels or the at least a portion of each of the plurality of next batch channels,
wherein each of the plurality of batch channels consists of a plurality of portions,
wherein the storing and calculating operations are performed sequentially for all portions of the plurality of portions constituting each of the plurality of batch channels, and
wherein the weight is maintained in a corresponding memory space of the memory spaces formed in the one memory until the calculating operation for all portions of the plurality of portions constituting each of the plurality of batch channels is completed.

21. The neural processing unit of claim 20,
wherein the plurality of batch channels includes a first batch channel and a second batch channel, and
wherein a portion of the first batch channel allocated to the one memory and a portion of the second batch channel allocated to the one memory are equal in size.

22. The neural processing unit of claim 21,
wherein the at least one PE is further configured to calculate a set of weights for a subsequent stage and values from the at least a portion of the first batch channel and the at least a portion of the second batch channel,
wherein the one memory is further configured to store the calculated values and the set of weights, and
wherein the set of weights is maintained in the at least one internal memory until the plurality of batch channels are calculated.

23. The neural processing unit of claim 21,
wherein the at least one PE is further configured to calculate first values from the at least a portion of the first batch channel and the at least a portion of the second batch channel and to calculate a subsequent set of weights for a subsequent processing stage, and
wherein the one memory is further configured to:
correspond in size to the at least a portion of the first batch channel and the at least a portion of the second batch channel, and
store the first values, the weight, and the subsequent set of weights.

24. The neural processing unit of claim 21, further comprising a scheduler configured to adjust a size of the weight, a size of the at least a portion of the first batch channel, and a size of the at least a portion of the second batch channel to the one memory.

25. A neural processing unit for an artificial neural network (ANN) for processing a plurality of batch channels, each batch channel of the plurality of batch channels being equal to a feature map, the neural processing unit comprising:

corresponding memory spaces respectively formed in one memory configured to store a weight and at least a portion of each of the plurality of batch channels; and at least one processing element (PE) configured to apply the stored weight to the at least a portion of the first batch channel and the at least a portion of each of the plurality of batch channels, each of the at least one PE including one or both of a multiply and accumulate operator and an arithmetic logic unit operator, wherein the at least a portion of each of the plurality of batch channels has a size less than or equal to a size of the one memory divided by a number of the plurality of batch channels, wherein the at least one PE is further configured to
calculate the at least a portion of each of the plurality of batch channels by the stored weight, while simultaneously prefetching in the one memory at least another portion of each of the plurality of batch channels or at least a portion of each of a plurality of next batch channels, wherein the prefetching in the one memory is a storing step that occurs prior to performing a calculation with the at least another portion of each of the plurality of batch channels or the at least a portion of each of the plurality of next batch channels, wherein each of the plurality of batch channels consists of a plurality of portions, wherein the storing and calculating operations are performed sequentially for all portions of the plurality of portions constituting each of the plurality of batch channels, and wherein the weight is maintained in a corresponding memory space of the memory spaces formed in the one memory until the calculating operation for all portions of the plurality of portions constituting each of the plurality of batch channels is completed.

26. The neural processing unit of claim 25, wherein the size of the one memory corresponds to a size of a largest feature map of the ANN and the number of the plurality of batch channels.

27. The neural processing unit of claim 25, wherein the one memory is further configured to store compressed parameters of the ANN.

28. The neural processing unit of claim 25, further comprising a processor located between the at least one PE and the one memory and configured to sequentially process feature maps corresponding to first and second batch channels of the plurality of batch channels to sequentially output activation maps corresponding to the first and second batch channels.

* * * * *